United States Patent
Brizzi et al.

(10) Patent No.: US 12,555,252 B2
(45) Date of Patent: *Feb. 17, 2026

(54) SYSTEMS AND METHODS FOR ALIGNING TRAJECTORY INFORMATION DERIVED FROM DIFFERENT SOURCE DATA

(71) Applicant: Lyft, Inc., San Francisco, CA (US)

(72) Inventors: Filippo Brizzi, London (GB); Lorenzo Peppoloni, London (GB); Michal Witkowski, London (GB)

(73) Assignee: Lyft, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/774,764

(22) Filed: Jul. 16, 2024

(65) Prior Publication Data

US 2024/0371011 A1 Nov. 7, 2024

Related U.S. Application Data

(63) Continuation of application No. 16/905,872, filed on Jun. 18, 2020, now Pat. No. 12,045,995.

(51) Int. Cl.
*G06T 7/246* (2017.01)
*G06T 7/70* (2017.01)
*G06V 20/56* (2022.01)

(52) U.S. Cl.
CPC ............... *G06T 7/248* (2017.01); *G06T 7/70* (2017.01); *G06V 20/56* (2022.01); *G06T 2207/30241* (2013.01); *G06T 2207/30252* (2013.01)

(58) Field of Classification Search
CPC .......... G06V 20/56; G06T 7/277; G06T 7/73; G06T 7/248; G06T 7/70; G06T 2207/10028; G06T 2207/10016; G06T 2207/30252; G06T 2207/20084; G06T 2207/20221; G06T 2207/10021;

(Continued)

(56) References Cited

PUBLICATIONS

Park C, Moghadam P, Kim S, Sridharan S, Fookes C. Spatiotemporal camera-LiDAR calibration: A targetless and structureless approach. IEEE Robotics and Automation Letters. Feb. 5, 2020;5(2):1556-63. (Year: 2020).*

(Continued)

*Primary Examiner* — Tracy Mangialaschi
(74) *Attorney, Agent, or Firm* — Lee Sullivan Shea & Smith LLP

(57) ABSTRACT

Examples disclosed herein may involve a computing system that is operable to (i) use a first approach to produce a first representation of an agent's trajectory from a first set of sensor data, (ii) use a second approach to produce a second representation of the agent's trajectory from a second set of sensor data, wherein the first and second representations of the agent's trajectory are based on different spatial reference frames and different temporal reference frames, (iii) align the spatial reference frames of the first and second representations by applying a spatial transformation to one of the first or second representations, (iv) align the temporal reference frames by applying an origin-time offset to one of the first or second representations, and (v) use the aligned first and second representations as a basis for evaluating an accuracy of the first approach relative to the second approach.

20 Claims, 20 Drawing Sheets

(58) Field of Classification Search
CPC . G06T 2207/20076; G06T 2207/30241; G06T 2207/20081
See application file for complete search history.

(56) References Cited

PUBLICATIONS

Taylor, Zachary, and Juan Nieto. "Motion-based calibration of multimodal sensor extrinsics and timing offset estimation." IEEE Transactions on Robotics 32.5 (2016): 1215-1229. (Year: 2016).*

Haas, Gary A., William F. Oberle, and Army Research Lab. "Juxtaposition of Inertial Navigation Sensor and Camera Egomotion Estimates of Ground Vehicle Trajectory: Results and Implementation Details." Army Research Laboratory Technical Report, ARL-TR-3096, Aberdeen Proving Ground, Maryland (2003). (Year: 2003).*

Haas, Gary A. et al. Juxtaposition of Inertial Navigation Sensor and Camera Egomotion Estimates of Ground Vehicle Trajectory: Results and Implementation Details. Army Research Laboratory Technical Report, ARL-TR-3096. 2003. 31 pages.

Haas, Gary et al. Toward Fusion of Camera-Based Egomotion and Inertial Navigation for a UGV (Unmanned Ground Vehicle) Traversing Natural Terrain. Unmanned Ground Vehicle Technology VI. Vol. 5422. SPIE, Sep. 2004. 12 pages.

Park, Chanoh et al. Spatiotemporal Camera-LiDAR Calibration: A Targetless and Structureless Approach. IEEE Robotics and Automation Letters, vol. 5 No. 2. pp. 1556-1563. 2020. 8 pages.

Zachary, Taylor et al. Motion-Based Calibration of Multimodal Sensor Extrinsics and Timing Offset Estimation. IEEE Transactions on Robotics, vol. 32, No. 5. pp. 1215-1229. Oct. 2016. 15 pages.

* cited by examiner

SYSTEMS AND METHODS FOR ALIGNING TRAJECTORY INFORMATION DERIVED FROM DIFFERENT SOURCE DATA

CROSS-REFERENCE TO RELATED APPLICATIONS

The current application is a continuation of U.S. patent application Ser. No. 16/905,872, filed on Jun. 18, 2020, which is hereby incorporated by reference in its entirety for all purposes.

BACKGROUND

Vehicles are increasingly being equipped with technology that enables them to monitor their surrounding environment and perform certain tasks with little or no human input, as appropriate. For instance, vehicles may be equipped with (i) sensors that are configured to capture various types of sensor data that is representative of the vehicle's surrounding environment, (ii) an on-board computing system that is configured to perform functions such as perception of the vehicle's surrounding environment (including object detection), prediction of future object behavior, and planning of the vehicle's future behavior, and (iii) actuators that are configured to control the physical behavior of the vehicle, among other possibilities.

SUMMARY

In one aspect, the disclosed technology may take the form of a method that involves (i) obtaining sensor data captured by a given vehicle during a given period of operation, wherein the captured sensor data comprises (a) a first set of sensor data captured by a first sensor system associated with the vehicle, and (b) a second set of sensor data captured by a second sensor system associated with the vehicle, (ii) deriving (a) a first representation of an agent's trajectory from the first set of sensor data captured by the first sensor system associated with the vehicle and (b) a second representation of the agent's trajectory from the second set of sensor data captured by the second sensor system associated with the vehicle, wherein the first and second representations of the agent's trajectory are based on different spatial reference frames and different temporal reference frames, (iii) aligning the spatial reference frames of the first and second representations by applying a spatial transformation to a given one of the first and second representations, and (iv) aligning the temporal reference frames of the first and second representations by determining an origin-time offset between the temporal reference frames of the first and second representations and applying the determined origin-time offset to timing information encoded in the given one of the first and second representations.

In example embodiments, aligning the spatial reference frames of the first and second representations by applying a spatial transformation to a given one of the first and second representations may comprise (i) identifying a spatial transformation to the given one of the first and second representations that achieves a best geometric match between the first representation and the second representation, and (ii) applying the identified spatial transformation to the given one of the first and second representations.

Further, in example embodiments, determining the origin-time offset between the temporal reference frames of the first and second representations may comprise identifying the origin-time offset that minimizes a positional error between a set of position and orientation ("pose") values included in the first representation and a counterpart set of pose values included in the second representation.

Further yet, in example embodiments, aligning the temporal reference frames of the first and second representations may further comprise aligning a first time-interval scale of the first representation with a second time-interval scale of the second representation. In these example embodiments, aligning the first time-interval scale of the first representation with the second time-interval scale of the second representation comprises adding interpolated pose values to at least one of the first representation or the second representation.

Still further, in example embodiments, aligning the spatial reference frames of the first and second representations may further comprise (i) identifying a rotation amount that minimizes an orientational error between a set of pose values included in the first representation and a counterpart set of pose values included in the second representation, and (ii) applying the identified rotation amount to each pose value of the set of pose values included in the given one of the first and second representations.

In example embodiments, the first sensor system comprises a type of sensor system that is being evaluated for use in collecting trajectories and the second sensor comprises a type of sensor system that has previously been validated for use in collecting trajectories.

Moreover, in example embodiments, the method may additionally involve, after aligning the spatial and temporal reference frames of the first and second representations, (i) using the first representation of the agent trajectory to derive a first dataset characterizing a given instance of a scenario type, (ii) using the second representation of the agent trajectory to derive a second dataset characterizing the given instance of the scenario type, (iii) including the first and second datasets characterizing the given instance of the scenario type as part of a comparison between data characterizing instances of the scenario type derived from the first set of sensor data captured by the first sensor system and data characterizing instances of the scenario type derived from the second set of sensor data captured by the second sensor system, (iv) based on the comparison, determining an error between the data characterizing instances of the scenario type derived from the first set of sensor data captured by the first sensor system and the data characterizing instances of the scenario type derived from the second set of sensor data captured by the second sensor system, and (v) using the determined error to evaluate an accuracy level of data characterizing instances of the scenario type derived from the first set of sensor data captured by the first sensor system relative to the data characterizing instances of the scenario type derived from the second set of sensor data captured by the second sensor system.

In another aspect, the disclosed technology may take the form of a computing system comprising at least one processor, a non-transitory computer-readable medium, and program instructions stored on the non-transitory computer-readable medium that are executable by the at least one processor such that the computing system is configured to carry out the functions of the aforementioned method.

In yet another aspect, the disclosed technology may take the form of a non-transitory computer-readable medium comprising program instructions stored thereon that are executable to cause a computing system to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

DETAILED DESCRIPTION

Figure 1:
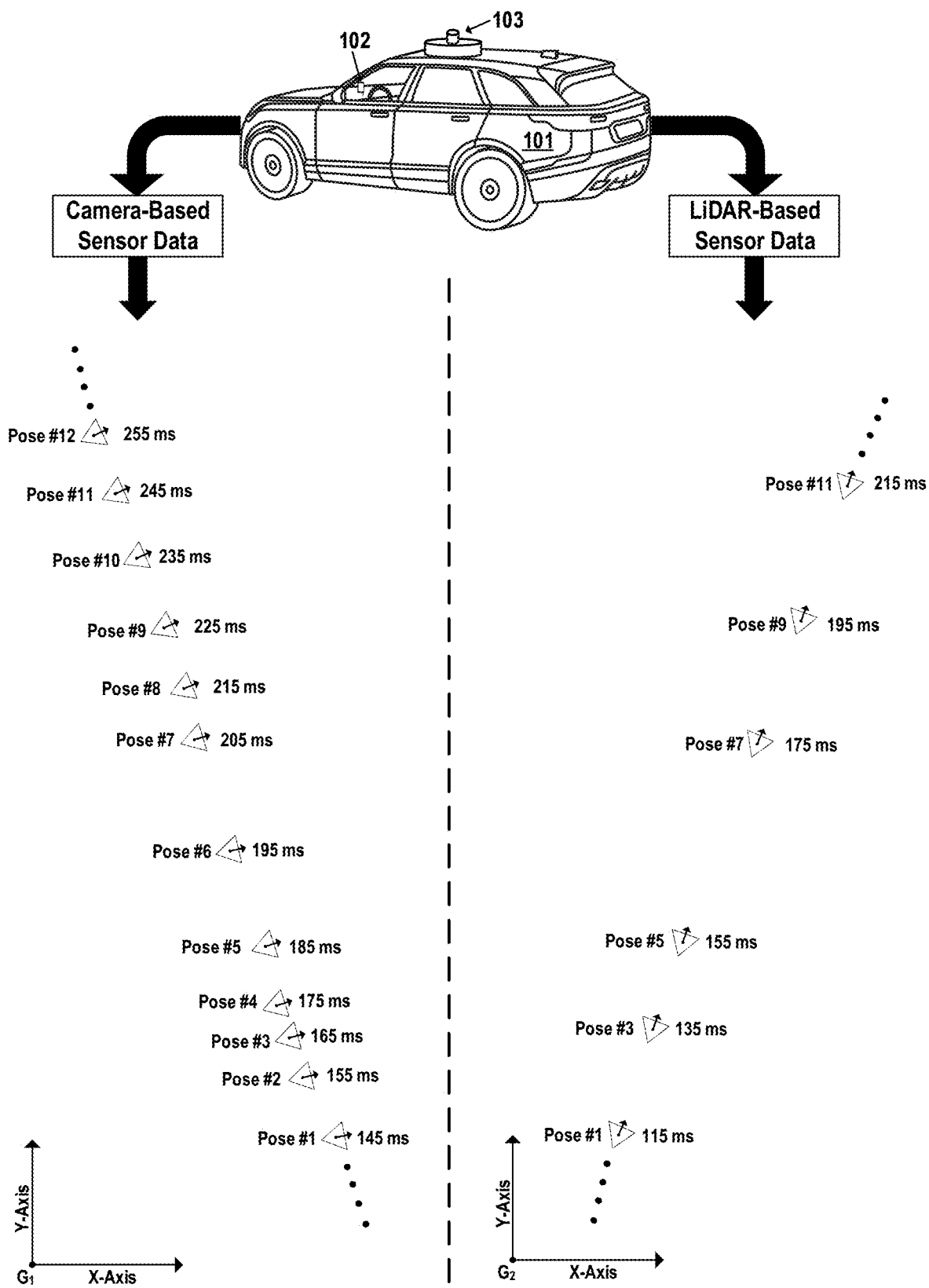
FIG. 1 is a diagram that illustrates one example of how the temporal and spatial reference frames of trajectory information collected by two sensor systems may differ.

Information regarding the prior behavior of vehicles or other types of agents within the real world can be used in various areas of technology to help improve operation. One specific example of this information is prior trajectories for vehicles or other types of agents in the real world, which can be used to help facilitate and improve various aspects of technology. (As used herein, a prior "trajectory" for an agent generally refers to the agent's motion and location within the real world over the course of some period of time, which may be represented in terms of a sequence of timestamped position and orientation ("pose") values for the agent, among other possibilities).

For instance, as one possibility, prior trajectories for vehicles or other types of agents in the real world can be encoded into map data that is made available to on-board computing systems of vehicles (e.g., vehicles equipped with autonomy systems and/or advanced driver assistance systems), and such map data can then be used by the vehicles' on-board computing systems to perform various operations.

One such operation may involve planning the future behavior of a vehicle, which generally involves deriving a behavior plan for the vehicle that defines the desired driving behavior of the vehicle for some future period of time (e.g., the next 5 seconds)—including the planned trajectory of the vehicle for that future period of time. For example, to the extent that a vehicle's on-board computing system has access to prior vehicle trajectories for the road on which the vehicle is currently traveling, the vehicle's on-board computing system may use those prior vehicle trajectories during planning in order to derive a planned trajectory for the vehicle that is informed by how other vehicles have historically traversed that same road. Advantageously, using prior trajectories of vehicles in this manner may enable a vehicle's on-board computing system to plan future behavior of the vehicle that is more naturalistic than behavior that is planned based on geometric and/or semantic map data alone.

Another such operation may involve predicting the future behavior of agents surrounding a vehicle. For example, to the extent that a vehicle's on-board computing system has access to prior agent trajectories for the road on which the vehicle is currently traveling, the vehicle's on-board computing system may use those prior agent trajectories to help predict the future behavior of agents surrounding the vehicle, and this predicted behavior of the surrounding agents may then be used to inform the on-board computing system's planning of the vehicle's behavior.

On-board computing systems of vehicles may use prior agent trajectories to help facilitate other operations as well.

As another possibility, prior trajectories of agents can be used to train machine learning models that are employed by on-board computing systems of vehicles during operation, such as machine learning models for predicting the future trajectories of surrounding agents that are detected by a vehicle's on-board computing system.

As yet another possibility, prior trajectories of vehicles and/or other types of agents in the real world can be encoded into map data that is made available to a transportation-matching platform (e.g., a platform that is configured to match individuals interested in obtaining transportation with vehicles capable of providing such transportation), and such map data can then be used by the transportation-matching platform to perform various different operations, including but not limited to matching individuals with available vehicles within the given area, generating the most optimal routes for vehicles to follow when picking up and/or transporting individuals within the given area, providing accurate estimates of pickup and drop-off times within the given area, and/or effectively pre-positioning vehicles within the given area in anticipation of responding to transportation requests, among other possibilities.

It should be understood that prior trajectories of agents can also be used to improve other technology areas as well.

In view of the foregoing, there is a need for an approach that allows prior trajectories of agents to be collected in a way that is both accurate and scalable. More specifically, in order to achieve the improvements discussed above, the prior trajectories of agents that are collected need to have a sufficient level of accuracy (e.g., at least lane-level accuracy)—otherwise, these prior trajectories generally cannot be used to improve the technology utilized by on-board computing systems and transportation-matching platforms. Likewise, in order to achieve the improvements discussed above, prior trajectories of agents generally need to be collected on a very large scale. For example, if the goal is to encode prior trajectories of agents into map data that is utilized by on-board computing systems or transportation-matching platforms to help perform certain operations in an improved way, then prior trajectories of agents need to be collected across an expansive array of different geographic areas. As another example, if the goal is to use prior trajectories of agents to train machine learning models utilized by a vehicle's on-board computing system to predict future trajectories of surrounding agents, then prior trajectories of agents need to be collected for a wide range of different circumstances that could potentially be faced by a vehicle. However, existing approaches for collecting prior trajectories of agents do not sufficiently satisfy both of these criteria.

Indeed, one existing approach for collecting prior trajectories of agents makes use of vehicles that are equipped with expensive, high-fidelity sensor systems, such as the types of Light Detection and Ranging (LiDAR)-based sensor systems that are found on autonomous vehicles, which are typically comprised of a LiDAR unit combined with a 360°-camera array and telematics sensors. As a vehicle equipped with such a high-fidelity sensor system is being driven within a given area of the real world (typically by humans, but perhaps also with some level of autonomous operation), the vehicle's high-fidelity sensor system captures high-fidelity sensor data that is indicative of the movement and location of the vehicle and perhaps other agents surrounding the vehicle within the given area, and processing may then be applied to this high-fidelity sensor data in order to derive trajectory information for the vehicle itself and perhaps also other agents in proximity to the vehicle.

Beneficially, the trajectories that are collected in this manner typically have a high level of accuracy. However, the total number of vehicles equipped with these types of high-fidelity sensor systems that currently exist in the world is relatively small—which is due to the fact that equipping vehicles with high-fidelity sensor systems is expensive and currently provides limited practical value outside of high-definition data collection and autonomous driving—and vehicles with these types of high-fidelity sensor systems are typically only found in a limited subset of geographic areas (e.g., cities where autonomous-driving technology is being tested). As such, it is currently neither practical nor realistic to collect prior trajectories of agents on a large scale using vehicles with these types of high-fidelity sensor systems.

Because of this, efforts are being made to develop new approaches for collecting prior trajectories of agents that are both sufficiently scalable and also sufficiently accurate. For instance, efforts are currently being made to develop approaches that enable prior trajectories of agents to be collected using lower-fidelity sensor systems that are less expensive and/or more widely available than the types of expensive, high-fidelity sensor systems typically found on autonomous vehicles (e.g., sensor systems that are not capable of capturing raw three-dimensional (3D) sensor data and/or have a limited field of view). One possible example of such a lower-fidelity sensor system may take the form of a camera-based sensor system that is comprised of a monocular and/or stereo camera along with telematics sensors, which may be the embodied within a device such as a smartphone, a tablet, a dashcam, or the like that can be placed somewhere within a vehicle (e.g., by being mounted on a dashboard or windshield of a vehicle). Another possible example of such a lower-fidelity sensor system may take the form of telematics-only sensor system comprised primarily of telematics sensors such as an Inertial Measurement Unit (IMU) and/or a Global Positioning System (GPS) unit, which may be embodied in a device such as a smartphone, a tablet, a navigation unit, or the like that can be placed somewhere within a vehicle (e.g., by being mounted on a dashboard or windshield of a vehicle, being placed in a cupholder or tray within the center console, or simply being in the pocket of a driver or passenger within the vehicle). Other examples of lower-fidelity sensor systems capable of capturing sensor data from which trajectory information can be derived are possible as well.

As with high-fidelity sensor systems, collecting agent trajectories using one of these types of lower-fidelity sensor systems may generally involve capturing sensor data that is indicative of the movement and location of a vehicle (and perhaps other agents surrounding the vehicle) as the vehicle is being driven within the real world, such as image data, IMU data, and/or GPS data among other possibilities, and then applying processing (e.g., localization techniques) to this captured sensor data in order to derive trajectory information for the vehicle (and perhaps also the other surrounding agents). Beneficially, these new approaches for collecting trajectories using less expensive, lower-fidelity sensor systems such as this will allow prior trajectories of agents to be collected on a much larger scale than an approach that relies on expensive, high-fidelity sensor systems such as those found on autonomous vehicles. However, because the sensor data captured by these types of sensor systems tends to have lower fidelity than the sensor data captured by expensive, high-fidelity sensor systems, these new approaches rely on the development of new processing technology that is capable of accurately deriving trajectory information for agents (e.g., the vehicles and/or their surrounding agents) from such lower-fidelity sensor data over a wide range of different circumstances that are faced by such vehicles.

As this new processing technology for deriving trajectories from sensor data captured by lower-fidelity sensor systems is developed, there is a corresponding need for a framework that enables reliable evaluation and validation of this new processing technology. Indeed, it is generally neither practical nor realistic to utilize a new approach for collecting prior trajectories of agents using lower-fidelity sensor systems unless and until it is determined that the trajectories being derived from the sensor data captured by such lower-fidelity sensor systems with a sufficient level of accuracy across a wide range of different circumstances that are faced by such vehicles.

In this respect, one possible framework for evaluating and validating new processing technology for deriving trajectories from sensor data captured by lower-fidelity sensor systems may involve (i) equipping a vehicle with both a first sensor system that is being evaluated for possible use in the collection of agent trajectories and a second sensor system that has already been validated for use in collecting accurate agent trajectories, (ii) using the two sensor systems to collect two different representations of a real-world trajectory of the vehicle (or a surrounding agent), which may have variations in accuracy due to differences in the sensor data that was captured and/or the processing techniques applied to such sensor data, and then (iii) comparing the two representations of the real-world trajectory of the vehicle (or a surrounding agent) to one another in order to evaluate and validate the accuracy of the trajectory representation that was collected using the first sensor system against the accuracy of the trajectory representation that was collected using the second sensor system. (It should also be understood that a similar framework may be used to evaluate and validate trajectory representations produced by a new processing technique that is applied to the same type of sensor data to which a previously-validated processing technique is applied).

For instance, to implement such a framework, each of a plurality of vehicles could be equipped with both a first, lower-fidelity sensor system that is being evaluated for possible use in the collection of agent trajectories and a second, high-fidelity sensor system that has already been validated for use in collecting accurate agent trajectories. After being equipped with these two sensor systems, each of these vehicles can then be driven within a given area of the real world while (i) the vehicle's first sensor system captures a first set of sensor data that is used to derive a first representation of the vehicle's trajectory (and perhaps also first trajectory representations for other agents in proximity to the vehicle) and (ii) the vehicle's second sensor system captures a second set of sensor data that is used to derive a second representation of the vehicle's trajectory (and perhaps also second trajectory representations for other agents in proximity to the vehicle). In this respect, the first and second representations that are derived for the vehicle are both representative of the same movement and location of the same vehicle within the real world, albeit with variations in accuracy due to differences in the sensor data that was captured and/or the processing techniques applied to such sensor data. Thus, once the first and second representations of a vehicle's trajectory are collected in this manner, comparing the first representation of the vehicle's trajectory against the second representation of the vehicle's trajectory may in theory provide an indication of whether the trajectory representations being derived from sensor data captured by the first sensor system have a sufficient level of accuracy.

Unfortunately, even though these two representations of the vehicle's trajectory are both representative of the same movement and location of the same vehicle within the real world, it is typically not possible to directly compare these two representations to evaluate the accuracy of one trajectory representation relative to another. Indeed, as noted above, trajectory representations that are derived in this manner typically take the form of a sequence of time-stamped pose values for the agent during some window of time during which the agent was traversing the real world, and as such, a direct comparison of different derived representations of the same agent's trajectory generally requires the pose values included in the different derived representations to be based on both the same temporal reference frame and also the same spatial reference frame. However, due to differences in the functional designs and/or physical placements of different sensor systems on a vehicle, the trajectory representations collected using different sensor systems are often based on different temporal and/or spatial reference frames.

For instance, in terms of the temporal reference frames, the trajectory representations derived from sensor data captured by the different sensor systems may be based on different origin times (e.g., the point in time that a given sensor system considers to be "zero" for purposes of capturing the sensor data used to derive a trajectory) and/or different time-interval scales (e.g., the duration of time between pose values included in a trajectory). Further, in terms of the spatial reference frames, the trajectory representations derived from sensor data captured by the different sensor systems may be based on different global reference frames (e.g., the understanding of an agent's location within the world) and/or different local reference frames (e.g., an understanding of an agent's orientation relative to a local point of origin for that agent). Because of these differences in the temporal and/or spatial reference frames, the first representation of the vehicle's trajectory that is derived based on sensor data captured by the vehicle's first sensor system may initially appear to be drastically different than the second representation of the vehicle's trajectory that is derived based on sensor data captured by the vehicle's second sensor system, despite the fact that these trajectory representations are representative of the same movement and location of the same vehicle within the real world.

One illustrative example of how the temporal and spatial reference frames of trajectory representations that are derived from sensor data captured by two sensor systems of a vehicle may differ is depicted in FIG. 1. As shown in FIG. 1, an example vehicle 101 having two different sensor systems, such as a camera-based sensor system 102 that is mounted to the vehicle's dashboard (which, as noted above, may be comprised of a monocular and/or stereo camera and telematics sensors that are embodied within a device such as a smartphone, a tablet, a dashcam, or the like) and a LiDAR-based sensor system 103 that is affixed to the vehicle's roof (which, as noted above, may be comprised of a LiDAR unit combined with a 360°-camera array and telematics sensors). However, it should be understood that camera-based sensor system 102 and LiDAR-based sensor system 103 are merely examples of sensor systems that are shown for purposes of illustration, and that each of sensor systems 102 and 103 may generally comprise any system of one or more sensors, embodied in any form, that is capable of capturing sensor data and/or other localization information from which a representation of a trajectory having a given level of accuracy (e.g., lane-level accuracy) can be derived—including a system comprising any one or more of a LiDAR unit, a monocular camera, a stereo camera, a GPS unit, an IMU, a Sound Navigation and Ranging (SONAR) unit, and/or a Radio Detection And Ranging (RADAR) unit, among other possible types of sensors.

While vehicle 101 is driven within a given area of the real world, (i) camera-based sensor system 102 may capture a first set of sensor data that is used to derive a first representation of a given agent's trajectory and (ii) LiDAR-based sensor system 103 may capture a second set of sensor data that is used to derive a second representation of a given agent's trajectory (where the given agent could either be vehicle 101 or another agent in proximity to vehicle 101). In this respect, as shown in FIG. 1, the first representation of the given agent's trajectory may comprise a first sequence of timestamped pose values for the given agent, and the second representation of the given agent's trajectory may comprise a second sequence of timestamped pose values for the given agent. (While FIG. 1 shows the pose values in a 2D space that represents the horizontal plane, it should be understood that the pose values included in each sequence could comprise either 2D values or 3D values).

In FIG. 1, the pose values within the first and second sequences have been assigned identification numbers to help indicate which pose values from the first sequence correspond to which pose values in the second sequence. For example, Pose #1 in the first sequence and Pose #1 in the second sequence correspond with one another, in the sense that these pose values are representative of the same temporospatial point along the given agent's real-world trajectory. In a similar way, Pose #3 in the first sequence corresponds to Pose #3 in the second sequence, Pose #5 in the first sequence corresponds to Pose #5 in the second sequence, and so on. However, despite the fact that these pose values are representative of the same temporospatial points along the given agent's real-world trajectory, there are categorical differences between the first and second trajectories shown in FIG. 1 that make it impossible to directly compare such pose values, which is due to the fact that the two different sequences of pose values are based on different temporal reference frames as well as different spatial reference frames.

For instance, FIG. 1 shows that the timestamps of the pose values included in the first sequence are not aligned with the timestamps of the corresponding pose values included in the second sequence, which is due to the fact that these two different sequences of pose values are based on different origin times. For example, as shown, Pose #1 in the first sequence has a timestamp of 145 ms while Pose #1 in the second sequence as a timestamp of 115 ms, Pose #3 in the first sequence has a timestamp of 165 ms while Pose #3 in the second sequence as a timestamp of 135 ms, and so on, which is due to the fact that the origin time used by camera-based sensor system 102 during capture was 30 ms earlier in time than the origin time used by LiDAR-based sensor system 103 during capture (e.g., camera-based sensor system 102 was initialized and/or began capturing sensor data 30 ms earlier than LiDAR-based sensor system 103). Because of this difference in origin times, it is not possible to use the pose values' timestamps to match up the pose values included in the first sequence with their corresponding pose values in the second sequence, which is one reason that it is not possible to directly compare the first and second representations of the given agent's trajectory.

Further, FIG. 1 shows that the first and second sequences of pose values are based on different time-interval scales, which may be due to the fact that camera-based sensor system 102 and LiDAR-based sensor system 103 capture sensor data using different sampling rates. For example, as shown, the pose values included in the first sequence are at 10-ms time intervals, which may correspond to a sampling rate of 100 captures of monocular image data per second, whereas the pose values included in the second sequence are at 20-ms time intervals, which may correspond to a sampling rate of 50 captures of LiDAR data per second. This difference in time-interval scales serves as another reason that it is not possible to directly compare the first and second representations of the given agent's trajectory.

Further yet, FIG. 1 shows that the two different sequences of pose values are based on different global reference frames, which is due to the fact that camera-based sensor system 102 and LiDAR-based sensor system 103 may represent positions in the world in relation to different points of origin and/or global axes directions (which may be defined by the maps used when processing the sensor data to derive the trajectories). For example, as shown, the pose values included in the first sequence are represented according to a first global reference frame comprising a first point of origin $G_1$ and a first set of axes directions, whereas the pose values included in the second sequence are represented according to a second reference frame comprising a second point of origin $G_2$ and a second set of global axes directions. Because of this difference in global reference frames, the two sequences of pose values are shown to be at two entirely different places in the world, despite the fact that these sequences of pose values are representative of the same real-world trajectory. This difference in global reference frames makes it impossible to perform a meaningful spatial comparison of the pose values included in the first sequence to their corresponding pose values in the second sequence, and thus serves as yet another reason that it is not possible to directly compare the first and second representations of the given agent's trajectory.

Still further, FIG. 1 shows that the two different sequences of pose values are based on different local reference frames, which is due to the fact that camera-based sensor system 102 and LiDAR-based sensor system 103 may represent the local orientations of agents using different local axes directions. For example, as shown, the pose values of the first sequence are represented according to local reference frames that define the directions of the x-axis and y-axis in a different manner than the local reference frames according to which the pose values of the second sequence are represented. Because of this difference in local reference frames, the pose values included in the first sequence are shown to have orientations that are entirely different than the orientations of the pose values included in the second sequence (i.e., the orientations of the pose values included in the first sequence are shown to point away from the given agent's direction of travel whereas the orientations of the pose values included in the second sequence are shown to point towards the given agent's direction of travel), which serves as still another reason that it is not possible to directly compare the first and second representations of the given agent's trajectory.

Accordingly, before a first representation of a given agent's trajectory that has been derived sensor data captured by a vehicle's first sensor system can be evaluated against a second representation of the given agent's trajectory that has been derived sensor data captured by the vehicle's second sensor system, the possible differences between the temporal and/or spatial reference frames of these different derived representations may need to be reconciled. In this respect, it may theoretically be possible to reconcile these possible differences by (i) modifying the design of the different sensor systems in a way that enables the sensor systems to capture sensor data according to the same temporal reference frame (e.g., by driving both sensor systems with a common time source), and then (ii) precisely positioning and calibrating the two different sensor systems on every single vehicle such that the different sensor systems capture sensor data according to the same spatial reference frame. However, such an approach would be costly, time consuming, and prone to error, among other problems. Further, while it may be possible to reconcile the differences between the global reference frames of the trajectories collected via the different sensor systems by using a common reference map that relates to the different global reference frames, such a common reference map—which is often expensive and difficult to generate—does not address either the possible differences in the temporal reference frames between different derived trajectories or the possible differences in the local reference frames between different derived trajectories.

In view of the foregoing, disclosed herein is a new technique for aligning different representations of an agent's real-world trajectory that are based on different temporal and/or spatial reference frames (e.g., representations of a same agent trajectory that have been derived from different sets of source data). For instance, as one possibility, the disclosed technique may be used to align (i) a first representation of an agent's real-world trajectory that is derived from sensor data captured by a lower-fidelity sensor system on a vehicle with (ii) a second representation of the agent's real-world trajectory that is derived from sensor data captured by a higher-fidelity sensor system on the vehicle. In this way, the disclosed technique may enable these different representations of the agent's real-world trajectory to be compared to one another without the need for any prior design modifications or physical calibration of different sensor systems, which may provide various advantages—including but not limited to the ability to evaluate and validate new technology for deriving trajectories of agents from sensor data captured by a lower-fidelity sensor systems in a manner that is less costly, time consuming, or error prone than an approach that requires design modifications and physical calibration of different sensor systems.

Figure 2:
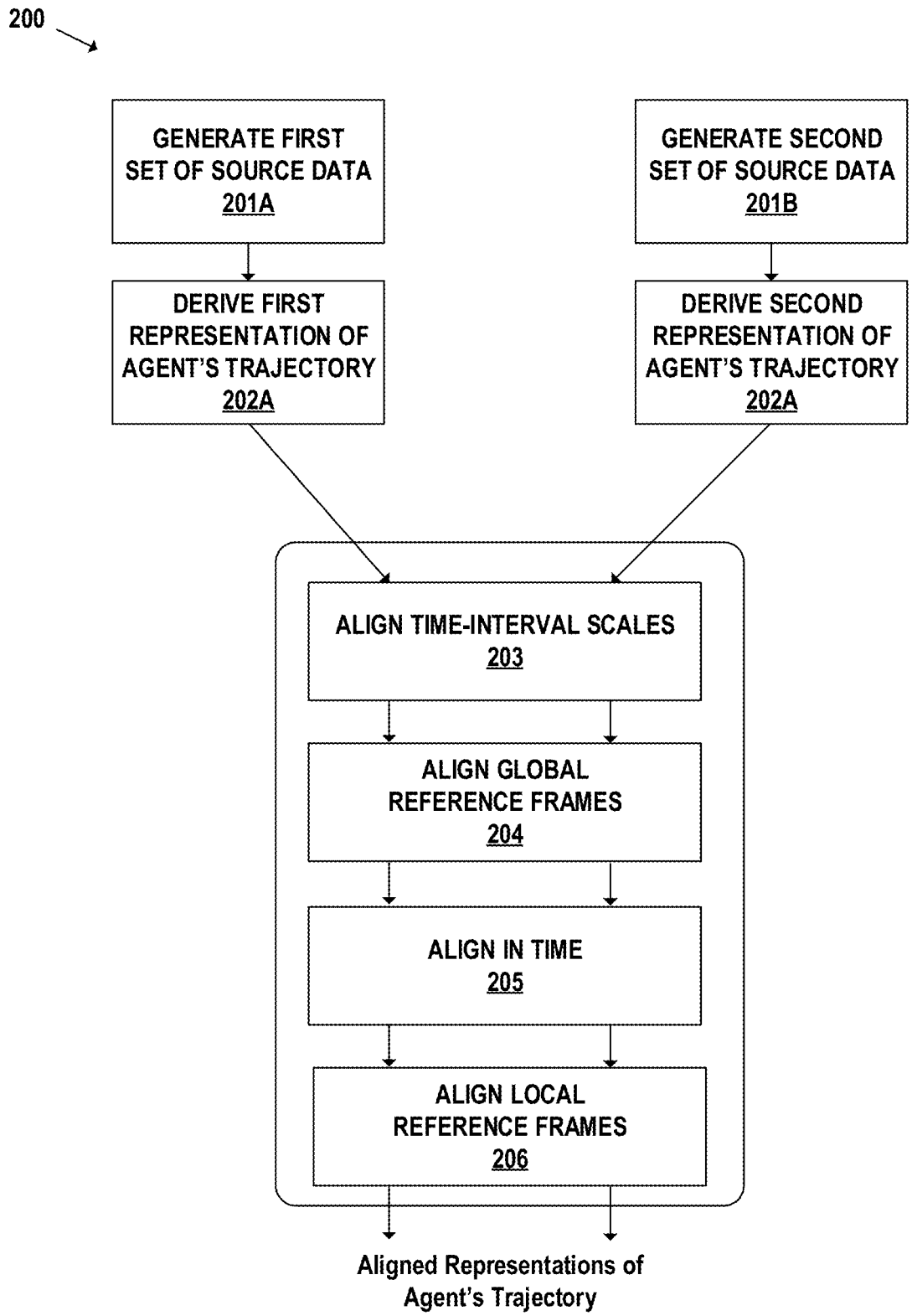
FIG. 2 is a diagram that illustrates one example of a framework that incorporates the disclosed technique for aligning different representations of an agent's trajectory that are based on different temporal and/or spatial reference frames.

One example of a framework that incorporates the disclosed technique for aligning trajectory information for an agent derived from different source data will now be described with reference to FIG. 2. As shown in FIG. 2, the example framework may begin with two different data sources generating respective sets of source data from which respective representations of the same given agent's real-world trajectory can be derived (e.g., respective datasets that are indicative of the real-world movement and location of the same given agent during the same period of time). For instance, at block 201A, a first data source generates a first set of source data from which a first representation of a given agent's real-world trajectory can be derived, and at block 201B, a second data source generates a second set of source data from which a second representation of a given agent's real-world trajectory can be derived. In this respect, the first and second data sources and the respective sets of source data may take any of various forms.

As one possibility, the first and second data sources may take the form of two different sensor systems on a vehicle that function to capture and output respective sets of sensor data while the vehicle is operating during a given period of time, where each respective set of sensor data provides information about the real-world movement and location of the vehicle itself and perhaps also the real-world movement and location of one or more other agents in proximity to the vehicle (e.g., other vehicles, pedestrians, bikes, scooters, etc.) during the given period of time. For instance, in line with the discussion above, a vehicle may be equipped with one sensor system that is under evaluation for use in collecting trajectories and another sensor system that has previously been validated for use in collecting accurate trajectories, which may enable a comparison between the trajectories collected using the two sensor systems.

In this respect, each of the sensor systems may generally comprise any system of one or more sensors, embodied in any form, that is capable of capturing sensor data and/or other localization information from which a trajectory having a given level of accuracy (e.g., lane-level accuracy) can be derived—including but not limited to a camera-based sensor system, telematic-only sensor system, a LiDAR-based sensor system, and/or some other type of sensor system. For example, the first data source could be a lower-fidelity sensor system such as a camera-based sensor system or a telematics-only sensor that is being evaluated for use in collecting trajectories, and the second data source could be a higher-fidelity sensor system such as a LiDAR-based sensor system that has already previously been validated for use in collecting accurate trajectories. However, it should be understood that the first and second data sources and the respective sets of source data may take other forms as well, including the possibility that one or both of the data sources could comprise a computing system that is configured to simulate the real-world movement and location of agents during the given period of time.

After the respective sets of source data are generated by the first and second data sources, a representation of a given agent's trajectory may be derived from each of the respective sets of source data. For instance, at block 202A, a first representation of a given agent's trajectory may be derived from the first set of source data, and at block 202B, a second representation of the given agent's trajectory may be derived from the second set of source data. In this respect, the given agent for which the first and second trajectories are derived could take various forms. As an example, if the first and second data sources comprise different sensor systems on a vehicle operating in the given area, then the given agent could be either the vehicle itself or a particular agent that was in proximity to the vehicle. However, the given agent may take other forms as well.

The technology that is used to derive the first and second representations of the given agent's trajectory from the respective sets of source data may also take various forms, which may depend on the type of source data being generated and the type of agent for which the trajectories are being derived. As one possible example, if the given agent is the vehicle itself, then the technology used to derive the first and second representations of the given agent's trajectory could comprise variants of localization technology (e.g., Simultaneous Localization and Mapping (SLAM))—such as one variant of localization technology that is being evaluated for use in deriving trajectories from lower-fidelity sensor data and another variant of localization technology that is known to produce accurate trajectories from higher-fidelity sensor data. As another possible example, if the given agent is a particular agent in proximity to the vehicle, then the technology used to derive the first and second representations of the given agent's trajectory could comprise variants of object-tracking technology—such as one variant of object-tracking technology that is being evaluated for use in deriving trajectories from lower-fidelity sensor data and another variant of object-tracking technology that is known to produce accurate trajectories from higher-fidelity sensor data. The technology that is used to derive the first and second representations of the given agent's trajectory may take other forms as well.

In line with the discussion above, the first and second representations of the given agent's trajectory that are derived at blocks 202A and 202B may each comprise a respective sequence of timestamped pose values for the given agent, although it is possible that the first and second representations of the given agent's trajectory could take other forms as well.

Further, in line with the discussion above, the first and second representations of the given agent's trajectory that are derived at blocks 202A and 202B may be based on different temporal and/or spatial reference frames. For example, the timestamps of the pose values included in the first and second representations of the given agent's trajectory may be based on different origin times (e.g., if first and second data sources used different points in time as their "zero" timepoint for purposes of generating the different sets of source data) and/or different time-interval scales (e.g., if the respective sets of source data were generated at different sampling rates), which may cause a temporal misalignment between the pose values included in the first and second representations of the given agent's trajectory that prevents effective comparison between such representations. As another example, the pose values included in the first and second representations of the given agent's trajectory may be based on different global reference frames (e.g., if an agent's position within the world is measured using a different point of origin or different axes directions) and/or different local reference frames (e.g., if an agent's orientation is measured using different local axes directions for the agent), which may cause a spatial misalignment between the pose values included in the first and second representations of the given agent's trajectory that prevents effective comparison between such representations.

To address any such misalignments that may be caused by differences in the temporal and/or spatial reference frames of the first and second representations of the given agent's trajectory, a sequence of alignment functions may then be carried out for the first and second representations of the given agent's trajectory. These alignment functions may take several forms and may be performed in several different orders.

For instance, in the example framework illustrated in FIG. 2, the sequence of alignment functions may begin at block 203 with an alignment of the time-interval scales of the first and second representations of the given agent's trajectory. This function of aligning the time-interval scales of the given agent's first and second first and second representations of the given agent's trajectory may take various forms.

As one possibility, this function may involve adding interpolated pose values to whichever representation has the longer time-interval scale in order to align that representation's time-interval scale with the shorter time-interval scale of the other representation. For example, if the first representation of the given agent's trajectory comprises pose values at 33.33-ms time intervals (which corresponds to a sampling rate of 30 data samples per second) and the second representation of the given agent's trajectory comprises pose values at 100-ms intervals (which corresponds to a sampling rate of 10 data samples per second), then two interpolated pose values could be added between each pair of consecutive pose values included in the second representation of the given agent's trajectory in order to change the time-interval scale of the second representation to 33.33-ms time intervals, which aligns with the time-interval scale of the first representation. In this respect, the interpolated pose values that are added to the representation of the given agent's trajectory having the longer time-interval scale may be derived using any technique now known or later developed, including but not limited to a technique that involves the use of a motion model (e.g., a Kalman filter) for the given agent.

As another possibility, this function may involve removing certain pose values from whichever representation has the shorter time-interval scale in order to align that representation's time-interval scale with the larger time-interval scale of the other representation. For example, if the first representation of the given agent's trajectory comprises pose values at 33.33-ms time intervals (which corresponds to a sampling rate of 30 data samples per second) and the second representation of the given agent's trajectory comprises pose values at 100-ms intervals (which corresponds to a sampling rate of 10 data samples per second), two out of every three pose values included in the first representation of the given agent's trajectory may be removed in order to change the time-interval scale of the first representation to 100-ms time intervals, which aligns with the time-interval scale of the second representation.

As yet another possibility, this function may involve resampling at least one of the first and second representations of the given agent's trajectory in order to change the time-interval scale of that representation to align with the time-interval scale of the other representation. For example, if the differences between the time-interval scales of the first and second representations of the given agent's trajectory are such that adding or removing pose values alone cannot achieve alignment of the time-interval scales (e.g., one representation has 33.33-ms time intervals and the other representation has 50-ms time intervals), one of the representations may be resampled in order to change the time-interval scale of that representation to align with the time-interval scale of the other representation.

The function of aligning the time-interval scales of the first and second representations of the given agent's trajectory may take other forms as well. Further, while the function of aligning the time-interval scales of the first and second representations of the given agent's trajectory is shown in FIG. 2 as a separate function from deriving the first and second representations of the given agent's trajectory (i.e., blocks 202A and 202B), it should be understood that these functions may be integrated together such that the functions of deriving the first and second representations of the given agent's trajectory are carried out in a manner that results in both representations having the same time-interval scale.

Next, at block 204, the global reference frames of the first and second representations of the given agent's trajectory may be aligned. This function of aligning the global reference frames of the first and second representations of the given agent's trajectory may take various forms.

For instance, as one possibility, this function may involve the use of an optimization algorithm that iteratively adjusts the position of the pose values included in a given one of the first and second representations of the given agent's trajectory (e.g., by translating the global point of origin and/or rotating the global axes according to which the pose values are represented) until it identifies the adjustment (or "transformation") that achieves the best match between the geometric shapes defined by the first and second representations of the given agent's trajectory (i.e., the best geometric alignment between the first and second representations), and this adjustment may then be applied to the pose values included in the given one of the first and second representations. In this respect, each iteration may involve (i) applying a respective transformation to the pose values included in a given one of the first and second representations, and then (ii) determining a value that represents the extent of the geometric match between the first and second representations when the respective transformation has been applied. Further, any technique now known or later developed may be used to carry out the geometric matching between the first and second representations of the given agent's trajectory, including but not limited to the technique described in the publication entitled "Least-squares estimation of transformation parameters between two point patterns" by S. Umeyama.

The function of aligning the global reference frames of the first and second representations of the given agent's trajectory may take other forms as well.

As discussed above, the timestamps of the pose values included in the first and second representations of the given agent's trajectory may also be misaligned by some time offset due to differences in the origin times on which the timestamps are based. To address this temporal misalignment, at block 205, the first and second representations of the given agent's trajectory (which are now based on a common global reference frame) may also be aligned in time. This function of aligning the first and second representations of the given agent's trajectory in time may take various forms.

For instance, as one possibility, this function may involve the use of an optimization algorithm that iteratively adjusts the timestamps of the pose values included in a given one of the first and second representations until it identifies an "optimal" time offset that minimizes the positional error between the pose values included in the first and second representations of the given agent's trajectory, which is designated as the time offset between the origin times of the first and second representations, and the pose values included in the given one of the first and second representations may then be shifted by this optimal time offset. In this respect, each iteration may involve (i) applying a respective time offset to the timestamps of the pose values included in a given one of the first and second representations, (ii) determining how the pose values included in the given one of the first and second representations "match up" with counterpart pose values included in the other one of the first and second representations after the respective time offset has been applied (e.g., based on a comparison between the timestamps), (iii) determining a positional difference between each pair of counterpart pose values that have been matched up together, and then (iv) aggregating the determined positional differences for the different pairs of counterpart pose values into a value that represents the matching error between the first and second representations when the respective time offset has been applied.

The function of aligning the first and second representations of the given agent's trajectory in time may take other forms as well.

Lastly, at block 206, the local reference frames of the first and second representations of the given agent's trajectory may be aligned. This function of aligning the local reference frames of the first and second representations of the given agent's trajectory may take various forms.

For instance, as one possibility, this function may involve the use of an optimization algorithm that iteratively rotates the local reference frame of each pose value included in a given one of the first and second representations of the given agent's trajectory until it identifies an "optimal" rotation amount that minimizes the orientation error between pose values included in the first and second representations of given agent's trajectory, and each of the pose values included in the given one of the first and second representations may then be rotated by this optimal rotation amount. In this respect, each iteration may involve (i) applying a respective rotation amount to the orientation of each of the pose values included in a given one of the first and second representations, (ii) determining an orientational difference between each pair of counterpart pose values between the first and second representations, and then (iii) aggregating the determined orientational differences for the different pairs of counterpart pose values into a value that represents the matching error between the first and second representations when the respective rotation amount has been applied.

The function of aligning the local reference frames of the first and second representations of the given agent's trajectory may take other forms as well.

By aligning the first and second representations of the given agent's trajectory in this manner, the disclosed technique makes it possible to directly compare these different representations of the given agent's trajectory to one another without the need for any prior design modifications or physical calibration of different data sources, which may give rise to several advantages—including but not limited to the ability to evaluate and validate new technology for deriving trajectory information for agents from sensor data captured by a lower-fidelity sensor systems in a manner that is less costly, time consuming, or error prone than a framework that requires design modifications and physical calibration of different sensor systems. Additionally, as described in further detail below, the disclosed technique for aligning different representations of an agent's trajectory may be used for other purposes as well.

It should be understood that FIG. 2 merely illustrates one possible implementation of the disclosed technique for aligning different representations of an agent's real-world trajectory that are based on different temporal and/or spatial reference frames (e.g., representations of a same agent trajectory that have been derived from different sets of source data), and that the disclosed technique may take other forms as well—including the possibility that example functions may be added, removed, rearranged into different orders, grouped together, and/or not grouped together at all. Indeed, while FIG. 2 shows four different functions being performed in order to align the first and second representations of the given agent's trajectory, it should be understood that one or more of these alignment functions may be unnecessary in some implementations. For example, in a circumstance where the first and second data sources are known to be generating source data using the same sample rate, it may be unnecessary to perform any alignment of the time-interval scales of the first and second representations of the given agent's trajectory. Further, while FIG. 2 shows one particular sequence in which the four alignment functions being performed, it should be understood that the alignment functions may be performed in a different sequence (and/or some alignment functions may be performed in parallel) in some implementations. Other variations of the disclosed technique for aligning trajectory information for an agent that is derived from different source data are possible as well.

One illustrative example of how the disclosed technique may be used to align two different representations of an agent's trajectory will now be described with reference to FIGS. 3A-3I. (While FIGS. 3A-3I show the representations of the agent's trajectory in a 2D space that represents the horizontal plane, it should be understood that the representations of an agent's trajectory could comprise either 2D representations or 3D representations).

Figure 3A:
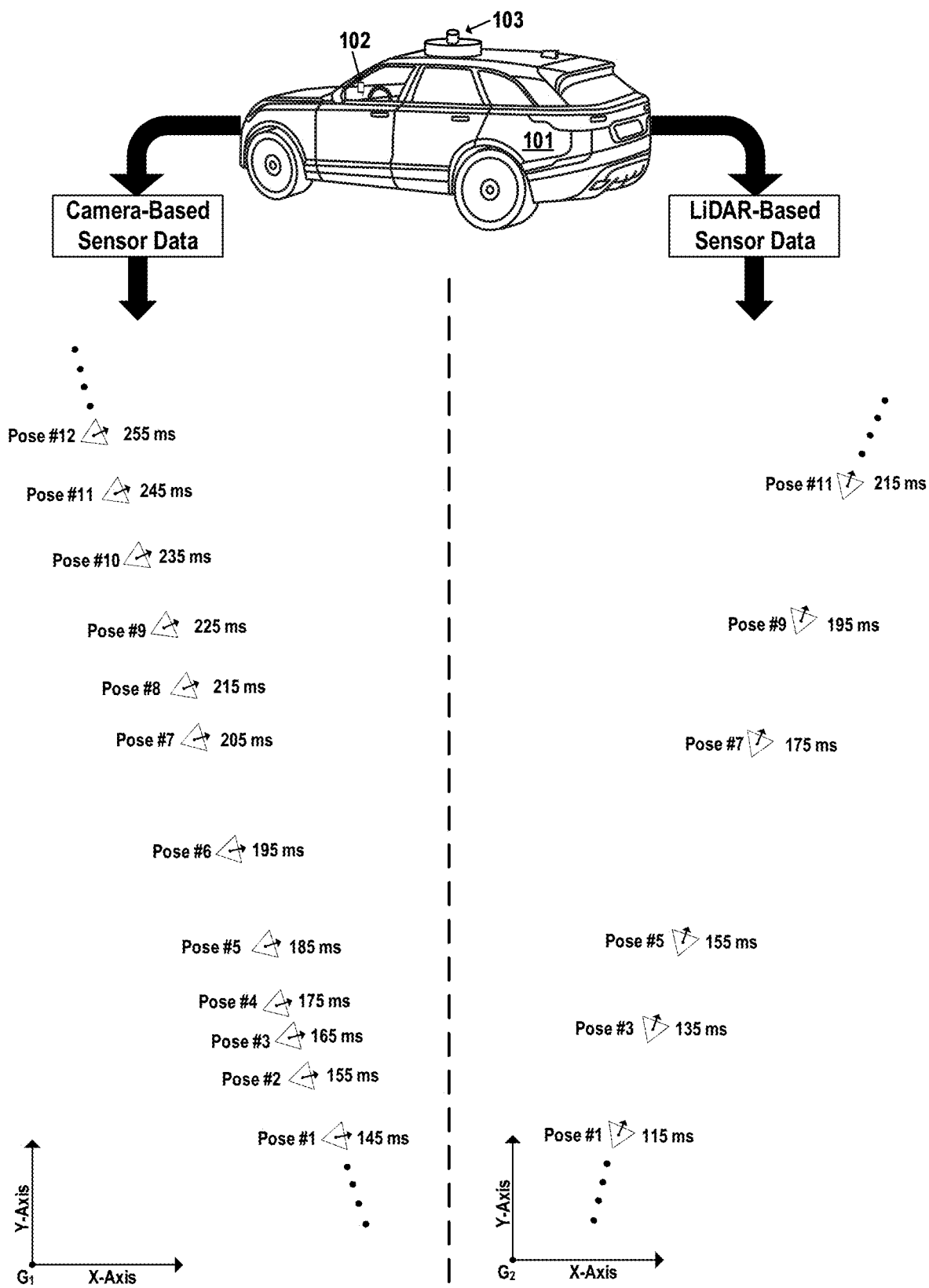
FIG. 3A is a diagram that illustrates one example of first and second representations of a given agent's trajectory that may be derived from different source data in accordance with the present disclosure.

Beginning with FIG. 3A, one possible example of first and second representations of a given agent's trajectory that may be derived at blocks 202A and 202B of the example pipeline is illustrated, and as shown, this example mirrors the example that was previously shown and described above with reference to FIG. 1. In particular, as in FIG. 1, FIG. 3A shows that an example vehicle 101 having two different sensor systems, such as a camera-based sensor system 102 that is mounted to the vehicle's dashboard (which, as noted above, may be comprised of a monocular and/or stereo camera and telematics sensors that are embodied within a device such as a smartphone, a tablet, a dashcam, or the like) and a LiDAR-based sensor system 103 that is affixed to the vehicle's roof (which, as noted above, may be comprised of a LiDAR unit combined with a 360°-camera array and telematics sensors). However, it should be understood that camera-based sensor system 102 and LiDAR-based sensor system 103 are merely examples of sensor systems that are shown for purposes of illustration, and that each of sensor systems 102 and 103 may generally comprise any system of one or more sensors, embodied in any form, that is capable of capturing sensor data and/or other localization information from which a representation of a trajectory having a given level of accuracy (e.g., lane-level accuracy) can be derived—including a system comprising any one or more of a LiDAR unit, a monocular camera, a stereo camera, a GPS unit, an IMU, a SONAR unit, and/or a RADAR unit, among other possible types of sensors.

While vehicle 101 is driven within a given area of the real world, (i) camera-based sensor system 102 may capture a first set of sensor data that is used to derive a first representation a given agent's trajectory, which takes the form of a first sequence of timestamped pose values for the given agent, and (ii) LiDAR-based sensor system 103 may capture a second set of sensor data that is used to derive a second representation of the given agent's trajectory, which takes the form of a second sequence of timestamped pose values for the given agent (where the given agent could either be vehicle 101 or another agent in proximity to vehicle 101). However, despite the fact that these pose values are representative of the same temporospatial points along the given agent's real-world trajectory, there are categorical differences between the first and second representations of the given agent's trajectory shown in FIG. 3A that make it impossible to directly compare such pose values, which is due to the fact that the two different sequences of pose values are based on different temporal reference frames as well as different spatial reference frames.

As discussed above, the disclosed technique provides a means for reconciling these differences in the temporal and spatial reference frames of the first and second representations of the given agent's trajectory by applying a sequence of alignment functions to the first and second representations of the given agent's trajectory. These alignment functions may take several forms and may be performed in several different orders.

Figure 3B:
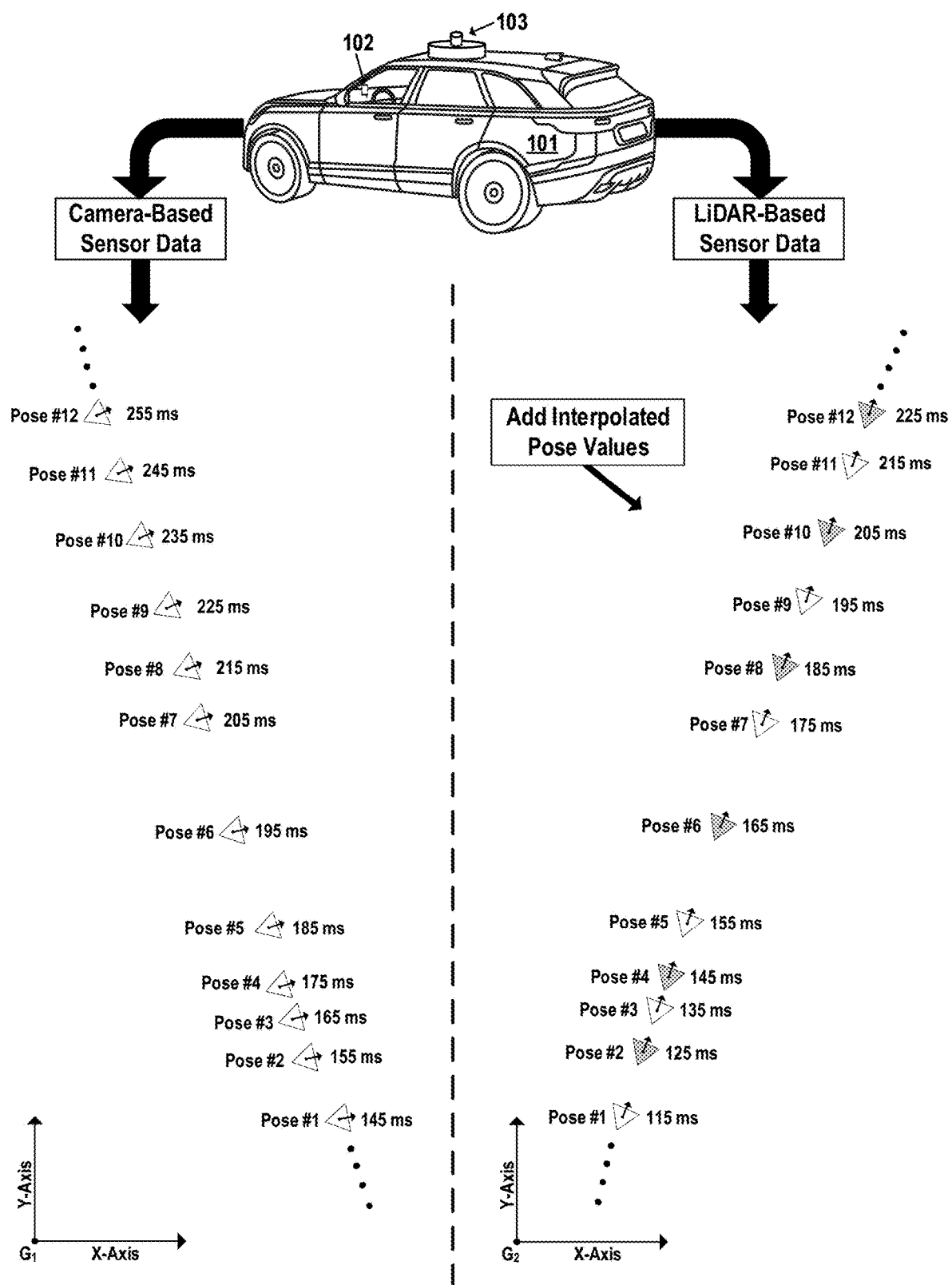
FIG. 3B is a diagram that illustrates one example of how an alignment of time-interval scales may be performed on first and second representations of a given agent's trajectory in accordance with the present disclosure.

In line with the discussion above, as one possibility, the sequence of alignment functions may begin with an alignment of the time-interval scales of the first and second representations of the given agent's trajectory. For instance, as shown in FIG. 3A, the first and second sequences of pose values are based on different time-interval scales (e.g., 10-ms time intervals for the first sequence versus 20-ms time intervals for the second sequence), which may be due to the fact that camera-based sensor system 102 and LiDAR-based sensor system 103 captured the respective sets of sensor data using different sampling rates. In accordance with the disclosed technique, one possible way to align these different time-interval scales is by adding one interpolated pose value at the middle timepoint between each pair of consecutive pose values included in the second sequence of pose values, which changes the time-interval scale of the second sequence from 20-ms time intervals to 10-ms time intervals and thereby aligns the time-interval scale of the second sequence with the time-interval scale of the first sequence. The end result of this alignment function is illustrated in FIG. 3B, which shows that interpolated pose values (indicated with gray shading) have been added to the second sequence of pose values at timestamps of 125 ms, 145 ms, 165 ms, 185 ms, 205 ms, and 205 ms in order to change the time-interval scale of the second sequence from 20-ms time intervals to 10-ms time intervals.

Once the time-interval scales of the first and second representations of the given agent's trajectory have been aligned, the sequence of alignment functions may next involve an alignment of the global reference frames of the first and second representations of the given agent's trajectory. For instance, as shown in FIG. 3B, the pose values included in the first sequence are represented according to a first global reference frame comprising a first global point of origin $G_1$ and a first set of global axes directions, whereas the pose values included in the second sequence are represented according to a second global reference frame comprising a second global point of origin $G_2$ and a second set of global axes directions. In accordance with the disclosed technique, one possible way to align these different global reference frames is by using an optimization algorithm that iteratively adjusts the position of the pose values included in the first sequence (e.g., by translating the global point of origin and/or rotating the global axes according to which the first sequence of pose values are represented) until it identifies the adjustment that achieves the best match in the geometric shapes defined by the first and second sequences of pose values, and the pose values included in the first sequence may then be transformed in accordance with this identified adjustment. The end result of this alignment function is illustrated in FIG. 3C, which shows that the first sequence of pose values has been rotated clockwise and shifted to the right in order to place such pose values in a position that achieves a best match between the geometric shape defined by the first sequence of pose values and the geometric shape defined by the second sequence of pose values, thereby aligning the global reference frames of the first and second representations.

Figure 3C:
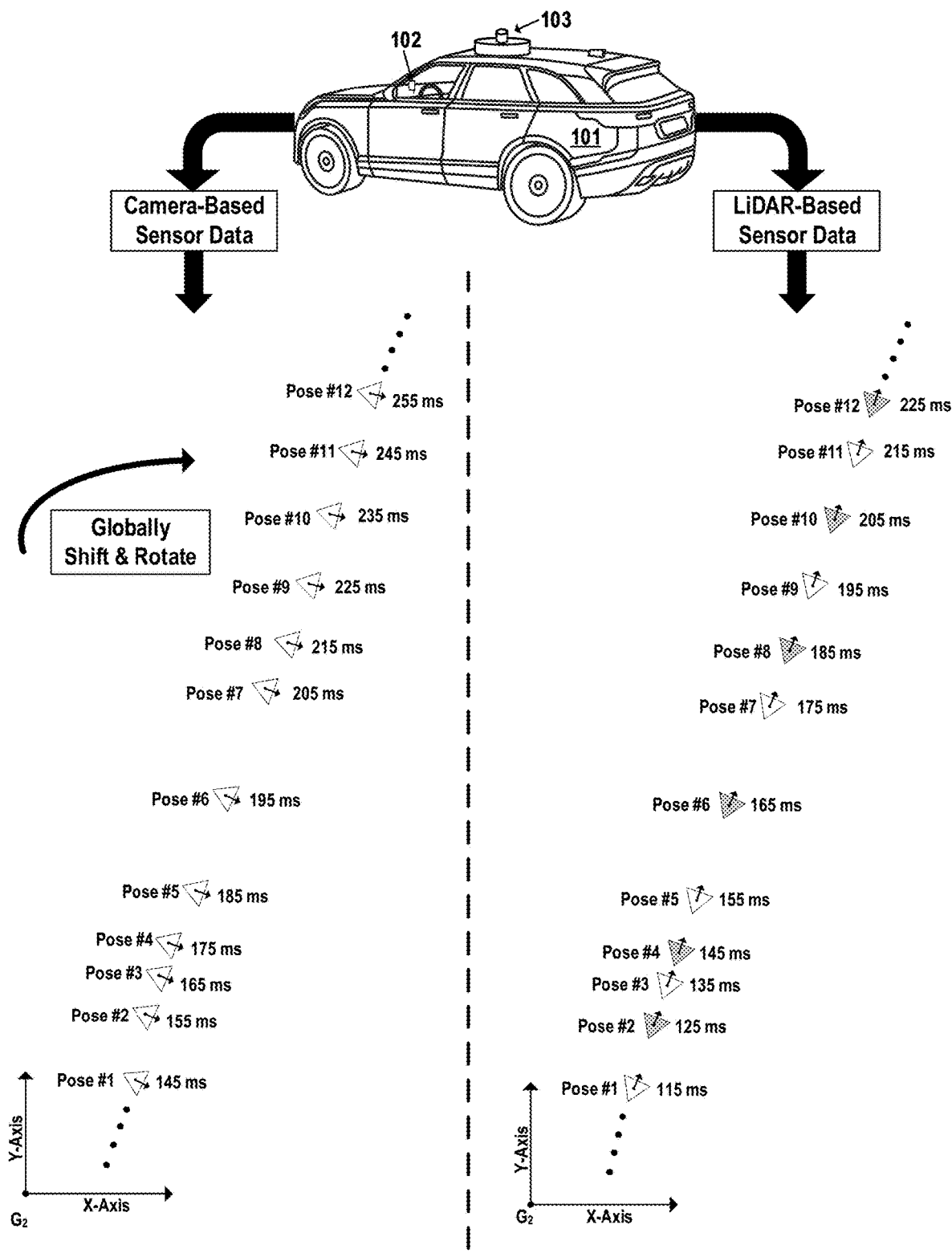
FIG. 3C is a diagram that illustrates one example of how an alignment of the global reference frames may be performed on first and second representations of a given agent's trajectory in accordance with the present disclosure.

However, FIG. 3C also illustrates that, because the timestamps of the pose values included in the first and second sequences are based on different origin times, there is still a time misalignment between the first and second representations of the given agent's trajectory. To address this time misalignment between the first and second representations of the given agent's trajectory (which are now based on a common global reference frame), the sequence of alignment functions may further involve a time alignment of the pose values included in the first and second sequences. In line with the discussion above, one possible way to align the pose values included the first and second sequences is by using an optimization algorithm that iteratively adjusts the timestamps of the pose values included in the first sequence until it identifies an "optimal" time offset that minimizes the positional error between the pose values included in the first and second sequences, and the pose values included in the first sequence may then be adjusted by this optimal time offset. In this respect, during each iteration, such an optimization algorithm may function to (i) apply a respective time offset to the timestamps of the pose values included in the first sequence, (ii) compute a rigid alignment between the respective pose values of the first and second representations in order to determine how the pose values included in the first sequence "match up" with counterpart pose values included in the second sequence after the respective time offset has been applied, (iii) determine a positional difference between each pair of counterpart pose values that have been matched up together, and then (iv) aggregate the determined positional differences for the different pairs of counterpart pose values into a value that represents the matching error between the first and second sequences when the respective time offset has been applied.

Figure 3D:
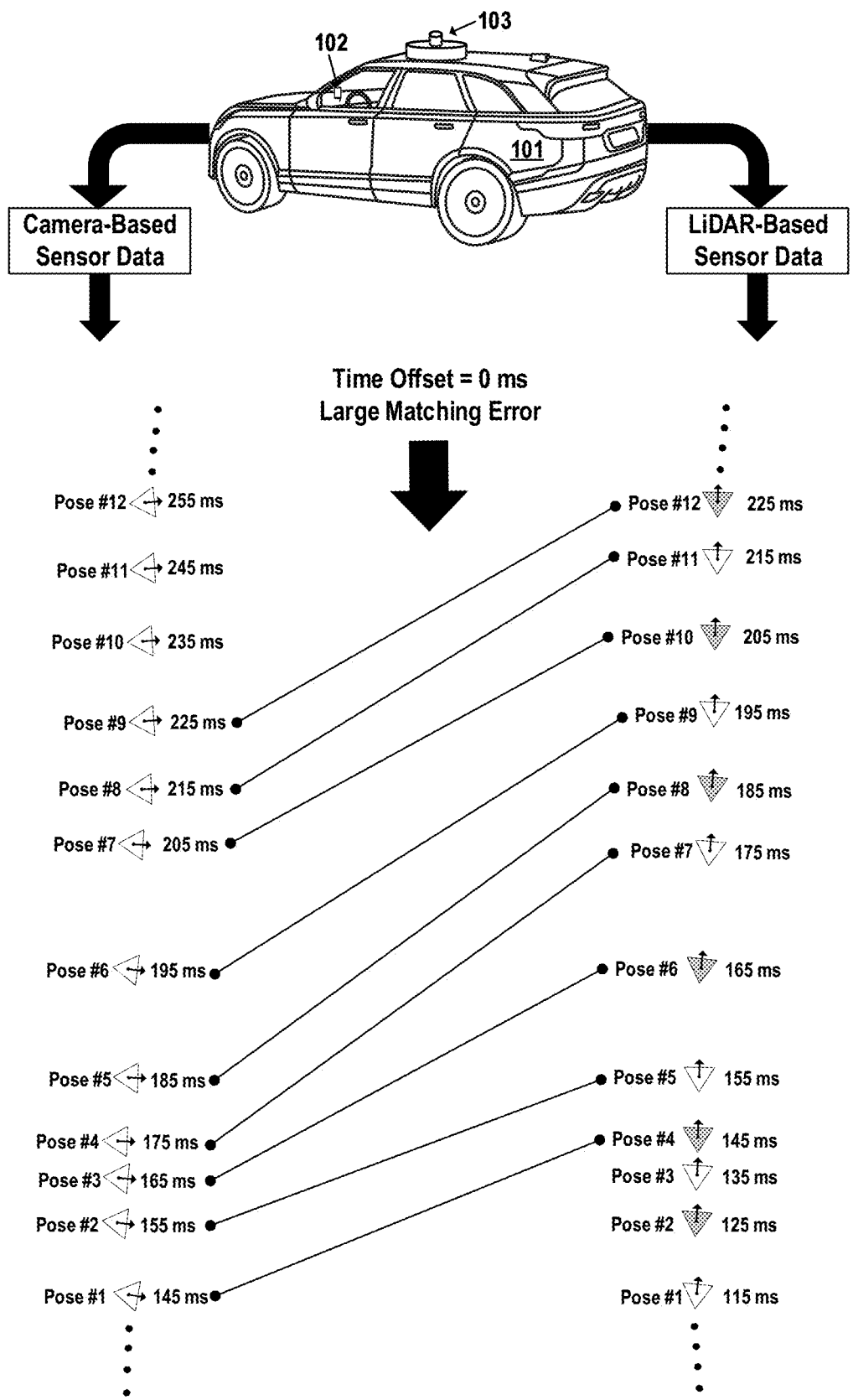
FIG. 3D is a diagram that illustrates a first example iteration of an optimization algorithm for identifying an "optimal" time offset that minimizes the positional error between first and second representations of a given agent's trajectory in accordance with the present disclosure.
Figure 3E:
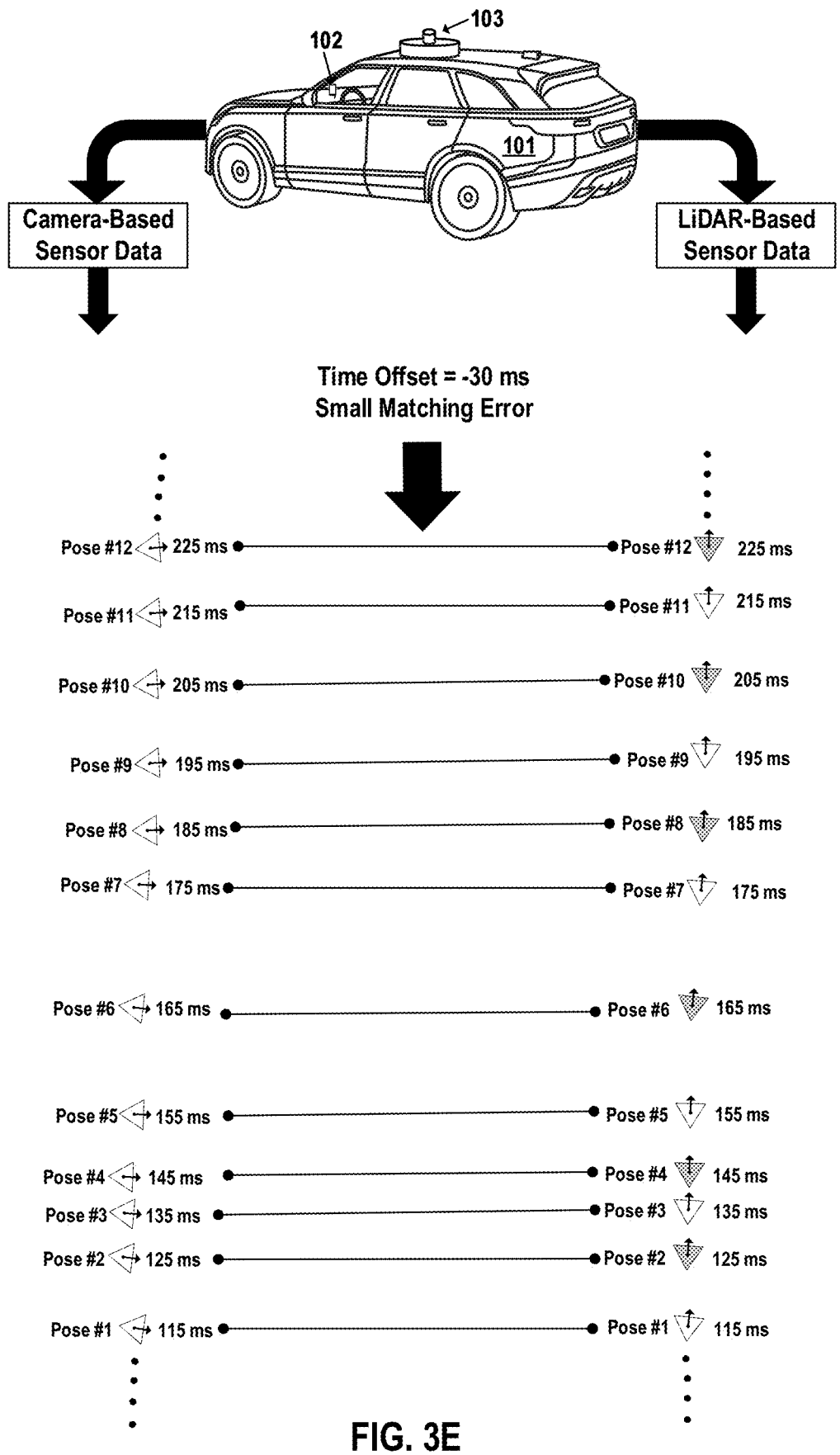
FIG. 3E is a diagram that illustrates a second example iteration of an optimization algorithm for identifying an "optimal" time offset that minimizes the positional error between first and second representations of a given agent's trajectory.
Figure 3F:
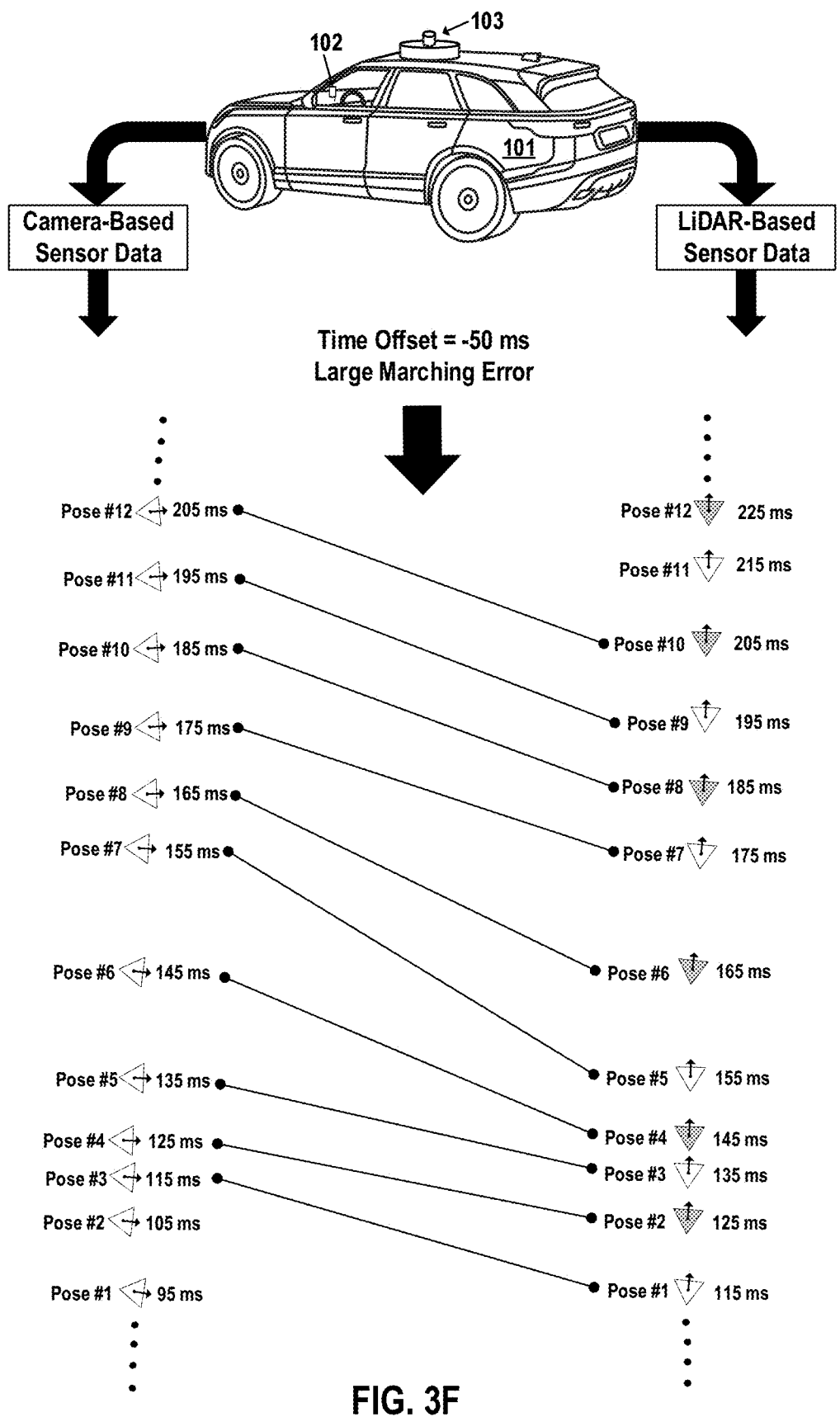
FIG. 3F is a diagram that illustrates a third example iteration of an optimization algorithm for identifying an "optimal" time offset that minimizes the positional error between first and second representations of a given agent's trajectory.

Some example iterations of such an optimization algorithm are illustrated in FIGS. 3D-3F. For instance, FIG. 3D illustrates an example iteration during which the optimization algorithm evaluates the positional error between the first and second sequences of pose values when no time offset (i.e., a time offset of 0 ms) has been applied to the timestamps of the pose values included in the first sequence. During this iteration, the optimization algorithm may begin by matching up Pose #1 of the first sequence with Pose #4 of the second sequence, which may be based on the fact that Pose #1 from the first sequence and Pose #4 from the second sequence share the same timestamp. This matchup between Pose #1 of the first sequence with Pose #4 of the second sequence is denoted in FIG. 3D with a line that extends between such counterpart pose values. Once this first pair of counterpart pose values has been matched, the optimization algorithm may then match up other pairs of pose values in a similar manner. For example, as shown, the optimization algorithm may match up Pose #2 from the first sequence with Pose #5 from the second sequence, Pose #3 from the first sequence with Pose #6 of the second sequence, and so on, where each additional pair of counterpart pose values is also denoted in FIG. 3D with a line that extends between such counterpart pose values.

After the pose values in the first sequence have been matched up with their counterpart pose values in the second sequence in this manner, the optimization algorithm may then determine a respective positional difference between each pair of counterpart pose values that have been matched together. For instance, in the example iteration shown in FIG. 3D, the optimization algorithm may determine a first positional difference between Pose #1 of the first sequence and Pose #4 of the second sequence, a second positional difference between Pose #2 of the first sequence and Pose #5 of the second sequence, a third positional difference between Pose #3 of the first sequence and Pose #6 of the second sequence, and so on. In this respect, the respective line that connects each pair of counterpart pose values in FIG. 3D provides a visualization of the positional difference between the counterpart pose values within each such pair. For example, the connecting lines extending from the pose values in the first sequence to their counterpart values in the second sequence all indicate a measurable positional difference, which ultimately amounts to a large overall matching error between the first sequence and the second sequence when a time offset of 0 ms is applied to the timestamps of the pose values included in the first sequence.

FIG. 3E illustrates another example iteration during which the optimization algorithm evaluates the positional error between the first and second sequences of pose values when a time offset of −30 ms has been applied to the timestamps of the pose values included in the first sequence. As shown in FIG. 3E, during this iteration, Pose #1 of the first sequence may be matched up with Pose #1 of the second sequence, Pose #2 of the first sequence may be matched up with Pose #2 of the second sequence, Pose #3 of the first sequence may be matched up with Pose #3 of the second sequence, and so on. In turn, the optimization algorithm may determine a first positional difference between Pose #1 of the first sequence and Pose #1 of the second sequence, a second positional difference between Pose #2 of the first sequence and Pose #2 of the second sequence, a third positional difference between Pose #3 of the first sequence and Pose #3 of the second sequence, and so on. In this respect, as indicated by the connecting lines in FIG. 3E, there are only nominal positional differences between the pose values of first sequence and the counterpart pose values of the second sequence, which amounts to a small overall matching error between the first sequence and the second sequence when a time offset of −30 ms is applied to the timestamps of the pose values included in the first sequence.

FIG. 3F illustrates yet another example iteration during which the optimization algorithm evaluates the positional error between the first and second sequences of pose values when a time offset of −50 ms has been applied to the timestamps of the pose values included in the first sequence. As shown in FIG. 3F, during this iteration, Pose #3 of the first sequence may be matched up with Pose #1 of the second sequence, Pose #4 of the first sequence may be matched up with Pose #2 of the second sequence, Pose #5 of the first sequence may be matched up with Pose #3 of the second sequence, and so on. In turn, the optimization algorithm may determine a first positional difference between Pose #3 of the first sequence and Pose #1 of the second sequence, a second positional difference between Pose #4 of the first sequence and Pose #2 of the second sequence, a third positional difference between Pose #5 of the first sequence and Pose #3 of the second sequence, and so on. In this respect, as indicated by the connecting lines in FIG. 3E, there are measurable positional differences between the pose values of first sequence and the counterpart pose values of the second sequence, which amounts to another larger matching error between the first sequence and the second sequence when a time offset of −50 ms is applied to the timestamps of the pose values included in the first sequence.

Figure 3G:
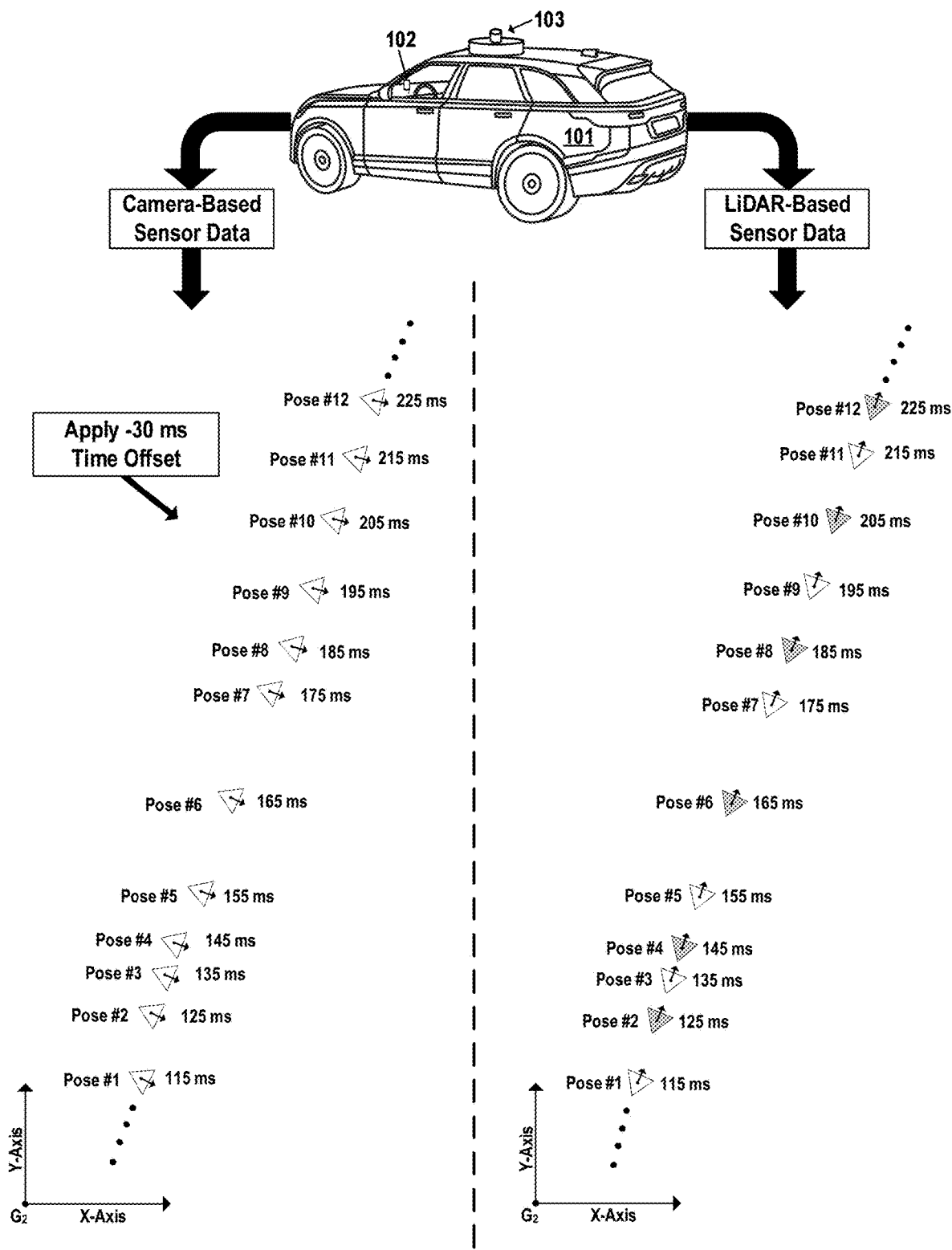
FIG. 3G is a diagram that illustrates one example of how a time alignment may be performed for first and second representations of a given agent's trajectory in accordance with the present disclosure.

After completing all of its iterations, the optimization algorithm may determine that applying a time offset of −30 ms to the first sequence of pose values minimizes the positional error between the pose values included in the first and second sequences, in which case the timestamps of the pose values included in the first sequence may then be adjusted by this optimal time offset. The end result of this alignment function is illustrated in FIG. 3G, which shows that the timestamps of the pose values included in the first sequence have each been adjusted by a time offset of −30 ms (e.g., the timestamp of Pose #1 has been adjusted from 145 ms to 115 ms, the timestamp of Pose #2 has been adjusted from 155 ms to 125 ms, and so on).

After the first and second sequences of pose values have been aligned in time in this manner, the sequence of alignment functions may lastly involve an alignment of the local reference frames of the first and second representations of the given agent's trajectory. In this respect, in line with the discussion above, one possible way to align the local reference frames of the first and second representations is by using an optimization algorithm that iteratively rotates the local reference frame of each pose value included in the first sequence until it identifies an "optimal" rotation amount that minimizes the orientation error between pose values included in the first and second sequences, and each of the pose values included in the first sequence may then be rotated by this optimal rotation amount.

Figure 3H:
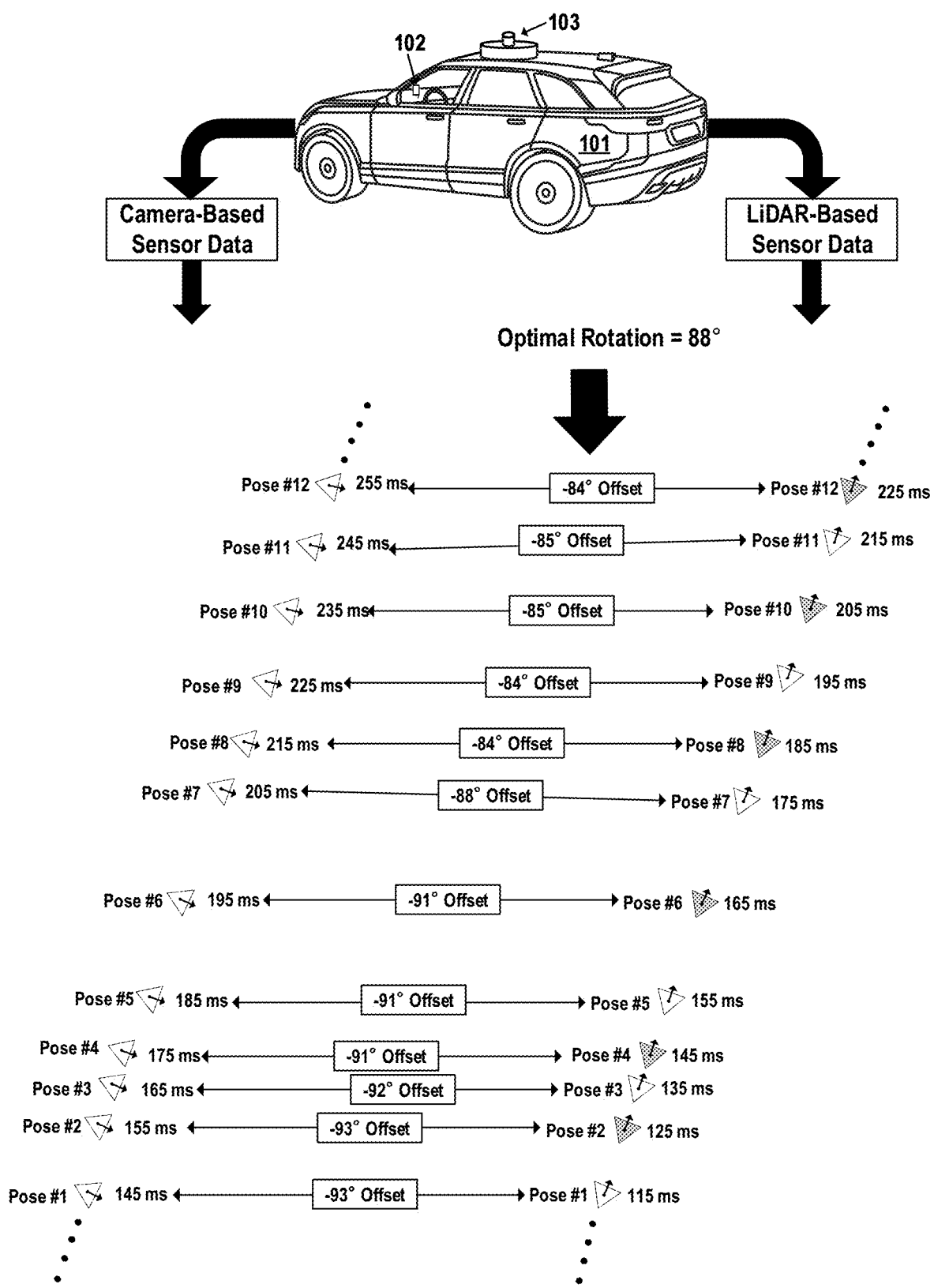
FIG. 3H is a diagram that illustrates one example of an optimization algorithm for identifying an "optimal" rotation amount that minimizes the orientation error between first and second representations of a given agent's trajectory.
Figure 3I:
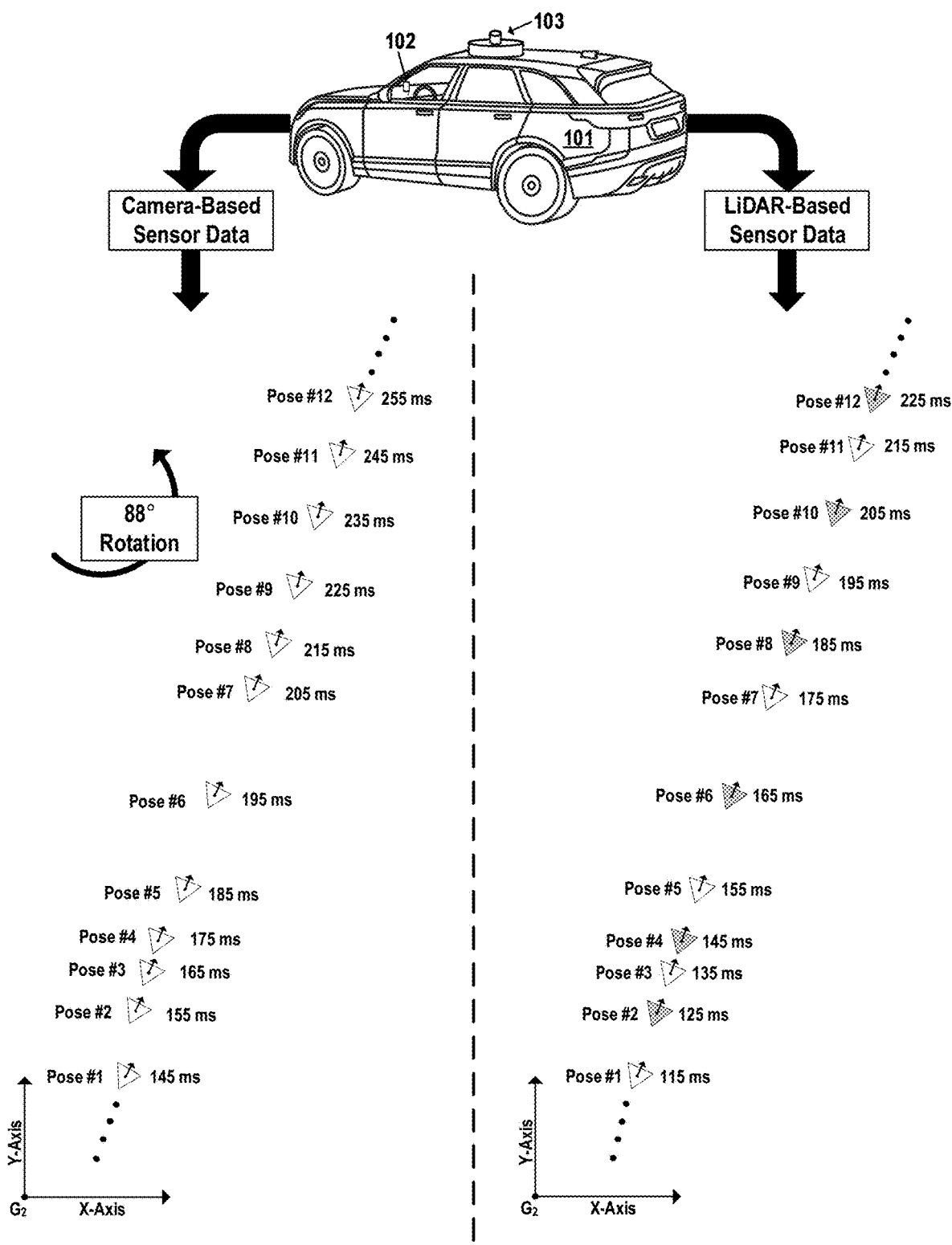
FIG. 3I is a diagram that illustrates one example of how an alignment of local reference frames may be performed on first and second representations of a given agent's trajectory in accordance with the present disclosure.

One possible example of such an optimization algorithm is illustrated in FIG. 3H. As shown, the optimization algorithm may begin by calculating a respective orientation error between each pair of counterpart pose values, and then once these orientation errors are calculated, the optimization algorithm may determine what amount of rotation would minimize these orientation errors. In this respect, in the example shown in FIG. 3H, the optimization algorithm may iterate through different rotation amounts until it determines that a rotation amount of 88° would minimize the orientation error the first and second sequences of pose values. In turn, each of the pose values included in the first sequence may be rotated by this 88° rotation amount in order to align the local reference frames of such pose values with the local reference frames of their counterpart pose values in the second sequence. The end result of this alignment function is illustrated in FIG. 3I, which shows that the pose values included in the first sequence have each been rotated by 88°.

Once the first and second sequence of poses have been aligned in this manner, it may then be possible to directly compare the first sequence of pose values with the second sequence of pose values, which may thereby enable the accuracy of the first sequence of pose values to be evaluated and validated. For instance, one possible way to directly compare the aligned first and second sequences of pose values may involve (i) using the timestamps to match up at least some of the pose values included in the first sequence with counterpart pose values included in the second sequence, (ii) determining a positional and orientational difference between each pair of counterpart pose values that have been matched together, and then (iii) aggregating the determined positional and orientational differences for the different pair of counterpart pose values across the first sequence into a value that represents the first sequence's matching error relative to the second sequence. The function of comparing the aligned first and second sequences of pose values may take various other forms as well.

It should be understood that FIG. 3A-3I merely illustrates one possible example of how the disclosed technique may be used to align two different representations of an agent's trajectory, and that the disclosed technique may take other forms as well—including the possibility that example functions may be added, removed, rearranged into different orders, grouped together, and/or not grouped together at all.

As discussed above, the disclosed technique for aligning representations of an agent's trajectory that are based on different temporal and/or spatial reference frames (e.g., trajectory representations derived from different source data) can be used to provide an improved framework for evaluating and validating new approaches for collecting prior trajectories of agents. For instance, as discussed above, the disclosed technique provides a means for directly comparing trajectory representations for agents that are collected using a new approach under evaluation against corresponding trajectory representations for the same agents that is collected using an existing approach that is known to be accurate, such as by performing a direct pose-by-pose comparison between the two different trajectory representations collected for each agent, and these direct comparisons can in turn be used to quantify the accuracy of the new approach for collecting trajectory representations in terms of an "error" metric (or the like) that indicates the extent to which trajectory representations collected using the new approach tend to differ from the trajectory representations collected using the existing approach. Advantageously, such an error metric could then be used to inform decisions as to whether a new approach for collecting prior trajectories of agents is doing so with a sufficient level of accuracy to allow such trajectories to be used for their intended purpose, which may include being used to help improve the accuracy of an on-board computing system's perception, prediction, and/or planning operations and/or being used to help improve the accuracy of a transportation-matching platform's route generation, ETA estimation, etc., among various other possibilities.

As another advantage, aspects of the disclosed technique could also be used to facilitate development and evaluation of new approaches for collecting data characterizing different scenarios types that may be encountered by a vehicle, examples of which may include a "cut-in" scenario where another agent cuts in front of a vehicle, an "unprotected left" scenario where a vehicle makes an unprotected left turn at an intersection, a "pedestrian ahead" scenario where a pedestrian is in a vehicle's field of view, etc. Indeed, the task of collecting data characterizing scenario types often relies on technology for deriving trajectory information for agents, because trajectory information for agents is often used as a basis for deriving at least some of the data that is used to characterizes scenario types of interest, which means that aspects of the disclosed technique for aligning trajectory information for agents could be used in a similar manner to that described above in order to provide an improved framework that enables evaluation and validation of new approaches for collecting data characterizing scenario types.

For instance, in practice, the process of collecting data characterizing a given scenario type may involve (i) having vehicles capture sensor data that provides information about the real-world movement and location of the vehicles and any surrounding agents, (ii) based on an evaluation of the captured sensor data and perhaps other available information about the vehicles' surrounding environments (e.g., map data), detecting instances of the given scenario type that were encountered by the vehicles, and (iii) for each detected instance of the given scenario type, deriving a respective set of values for certain parameters that are used to characterize the given scenario type. In this respect, depending on the given scenario type for which the data is being collected, it may be necessary to derive trajectory information for the vehicles and/or their surrounding agents from the captured sensor data because this trajectory information may serve as a basis for the functions of detecting the instances of the given scenario type and/or deriving the data values for certain of the parameters that are used to characterize the given scenario type.

To illustrate with an example, the process of collecting data characterizing a cut-in scenario type may begin with a number of sensor-equipped vehicles capturing sensor data that provides information about the real-world movement and location of the sensor-equipped vehicles themselves as well as any surrounding vehicles that are detected (among other types of agents). Next, the captured sensor data and other available information about the sensor-equipped vehicles' surrounding environments may be evaluated in order to detect instances of the cut-in scenario type that were encountered by the sensor-equipped vehicles—which may involve the use of trajectory information for the sensor-equipped vehicles and their surrounding agents. For example, an instance of a cut-in scenario type may be deemed to have occurred at a point in time when a sensor-equipped vehicle perceives that another vehicle in a different lane has crossed a boundary of the sensor-equipped vehicle's lane within a threshold distance in front of the sensor-equipped vehicle, in which case the detection of instances of the cut-in scenario type may be based on an evaluation of sensor-equipped vehicle's trajectory information as derived from the captured sensor data, the other vehicle's trajectory information as derived from the captured sensor data, and semantic map data that provides lane information for the sensor-equipped vehicle's surrounding environment (among other possibilities).

For each detected instance of the cut-in scenario type, a respective set of data values may then be derived for certain parameters that are used to characterize the cut-in scenario type, which may again involve the use of trajectory information for the sensor-equipped vehicles and their surrounding agents. For example, the parameters that are used to characterize the cut-in scenario type may include (i) the distance between the sensor-equipped vehicle and the other vehicle at the time of the cut-in, (ii) the orientation difference between the sensor-equipped vehicle and the other vehicle at the time of the cut-in, and (iii) the speed difference between the sensor-equipped vehicle and the other vehicle at the time of the cut-in—each of which may be derived based on aspects of the trajectory information for the sensor-equipped vehicle and the other vehicle.

Figure 4A:
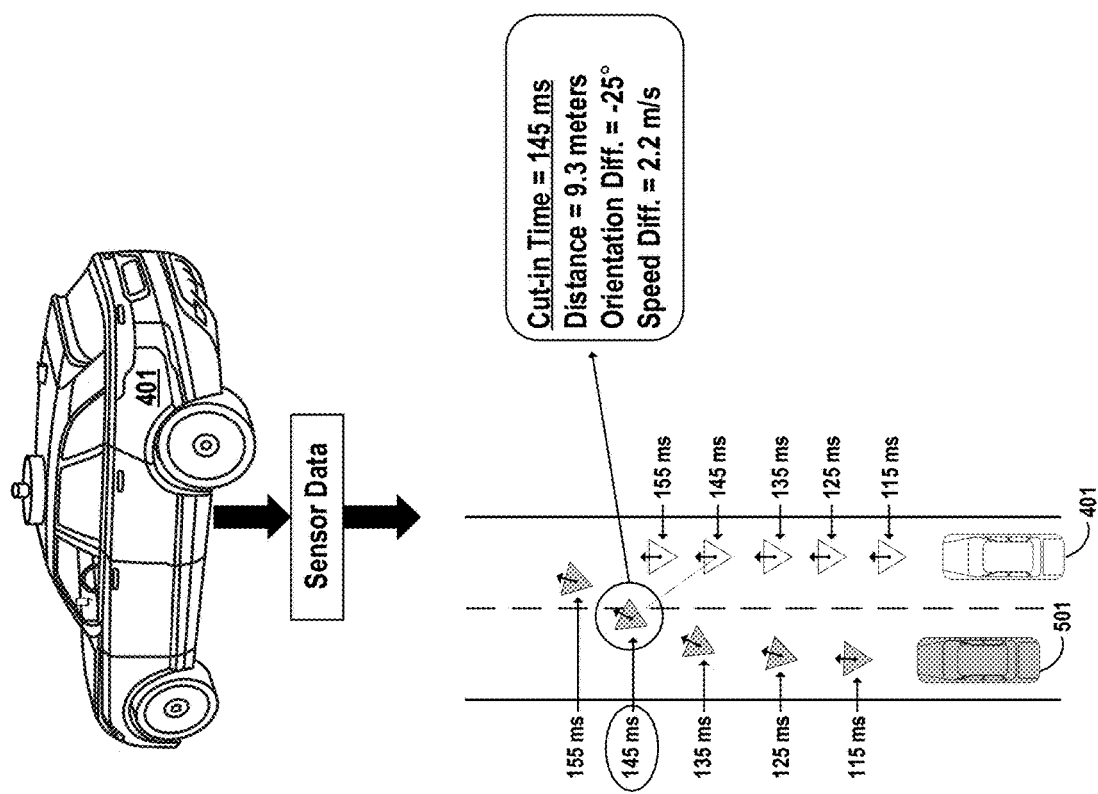
FIG. 4A is a diagram that illustrates one example of how data characterizing an instance of a cut-in scenario type may be derived.

One specific example of deriving data characterizing an instance of a cut-in scenario type is depicted in FIG. 4A. As shown in FIG. 4A, an example vehicle 401 may be driven within a given area of the real world while a sensor system of vehicle 401 captures sensor data that provides information about the real-world movement and location of vehicle 401 as well as other vehicles in proximity to vehicle 401, such as vehicle 501. After this sensor data is collected, trajectory information may be derived from such sensor data for vehicle 401 and other vehicles in proximity to vehicle 401, such as vehicle 501, so that this trajectory information can then be used to facilitate the functions of detecting instances of the cut-in scenario type and deriving the data values for certain of the parameters that are used to characterize the cut-in scenario type. For example, as shown in FIG. 4A, trajectory information for vehicle 401 and vehicle 501 may be derived from the sensor data, where such trajectory information for each agent comprises a respective sequence of timestamped pose values for the agent. (While FIG. 4A shows the pose values in a 2D space that represents the horizontal plane, it should be understood that the pose values included in each sequence could comprise either 2D values or 3D values).

After the trajectory information has been derived for vehicle 401 and vehicle 501, this trajectory information may be used along with semantic map data that provides lane information for the given area to detect an instance of the cut-in scenario type. For example, as shown in FIG. 4, an instance of the cut-in scenario type may be deemed to have occurred at a time of 145 ms (according to the temporal reference frame of the sensor system) due to the fact that the trajectory information for vehicle 501 shows vehicle 501 crossing into the lane of vehicle 401 at a time of 145 ms, which may be referred to as the "cut-in time" for this instance of the cut-in scenario time.

Once this instance of the cut-in scenario type has been detected, the trajectory information for vehicle 401 and vehicle 501 may also be used to derive data characterizing the instance of the cut-in scenario type. For example, as shown FIG. 4A, the characterizing data that is derived for the instance of the cut-in scenario type may include (i) a distance between vehicle 401 and vehicle 501 at the cut-in time of 145 ms, which may be determined based on the respective pose values of vehicle 401 and vehicle 501 at the cut-in time of 145 ms (ii) an orientation difference between vehicle 401 and vehicle at the cut-in time of 145 ms, which may be determined based on the respective pose values of vehicle 401 and vehicle 501 at the cut-in time of 145 ms, and (iii) a speed difference between vehicle 401 and vehicle at the cut-in time of 145 ms, which may be determined based on velocity information for vehicle 401 and vehicle 501 that may be include in (or can otherwise be derived from) the trajectory information for vehicle 401 and vehicle 501.

After collecting data characterizing scenario types in this manner, such data may be used for various purposes. As one possibility, the collected data characterizing the scenario types could be used to train machine learning models for predicting which of various different scenario types are being faced by a vehicle, and such machine learning models can then be used by a vehicle's on-board computing system to further inform the perception, prediction, and/or planning operations for the vehicle. For example, if such machine learning models output a prediction that a vehicle is facing a particular scenario type, the vehicle's on-board computing system could take this additional information into account when detecting the agents surrounding the vehicle, predicting the future trajectories of such agents, and/or planning the vehicle's own behavior, which may improve the accuracy of such operations in a way that could ultimately lead to safer driving behavior (among other possible advantages).

As another possibility, the collected data characterizing the scenario types could be used to identify particular areas in the world where scenario types of interest are frequently encountered and then encode this scenario-type information into map data for such areas that is made available to a vehicle's on-board computing system. In turn, this map data could be used by an on-board computing system when a vehicle is operating in such areas in order to further inform the perception, prediction, and/or planning operations for the vehicle. For example, if map data for a given area in which a vehicle is operating indicates that a particular scenario type is frequently encountered by vehicles within that area, the vehicle's on-board computing system could take this additional information into account when detecting the agents surrounding the vehicle, predicting the future trajectories of such agents, and/or planning the vehicle's own behavior, which may improve the accuracy of such operations in a way that could ultimately lead to safer driving behavior (among other possible advantages).

As yet another possibility, the collected data characterizing the scenario types could be used to generate simulations in which vehicles operating in a simulated environment are presented with instances of various different scenario types of interest across various different times, geographic locations, weather conditions, etc. In this respect, such simulations may provide a means for evaluating how an on-board computing system is likely to perform when presented with each of these different scenario types of interest in the real world, which may help guide further development of the technology utilized by an on-board computing system to perform the perception, prediction, and/or planning operations.

The collected data characterizing the scenario types could also be used in other ways to improve the operations carried out by an on-board computing system. Likewise, it should be understood that collected data characterizing the scenario types could be used to improve other technology areas as well. For instance, map data that has been encoded with scenario-type information as described above could also be used by a transportation-matching platform to perform tasks such as generating vehicle routes and/or determining vehicle ETAs in a more accurate way, among various other possibilities.

However, because the task of collecting data characterizing scenario types often relies on technology for deriving trajectory information for agents, many of the same issues discussed above with respect to approaches for collecting prior trajectories of agents are also applicable to approaches for collecting data characterizing scenario types. Indeed, existing approaches for collecting data characterizing scenario types typically rely on vehicles equipped with expensive, high-fidelity sensor systems, which cannot be used to collect data on a large scale, and while efforts are being made to develop new approaches for collecting data characterizing scenario types using vehicles equipped with lower-fidelity sensor systems that are less expensive and/or more widely available than such high-fidelity sensor systems (e.g., monocular cameras, stereo cameras, and/or telematics sensors), it is generally not practical or realistic to utilize these new approaches unless and until it is determined that they are collecting data characterizing the scenario types with a sufficient level of accuracy across a wide range of different circumstances.

In this respect, as noted above, aspects of the disclosed technique for aligning trajectory information for agents that is derived from different source data could be used to provide an improved framework for evaluating and validating a first approach for collecting data characterizing scenario types (e.g., an approach that relies on vehicles equipped with lower-fidelity sensor systems) against a second approach for collecting data characterizing scenario types that is known to be accurate (e.g., an approach that relies on vehicles equipped with high-fidelity sensors).

For instance, to implement such a framework, each of a plurality of vehicles could be equipped with both a first sensor system that is being evaluated for possible use in the collection of data characterizing scenario types (e.g., a camera-based sensor system or telematics-only sensor system) and a second sensor system that has already been validated for use in collecting accurate data characterizing scenario types (e.g., a LiDAR-based sensor system). After being equipped with these two different sensor systems, each of these vehicles can then be driven within the real world while (i) the vehicle's first sensor system captures a first set of sensor data that is used to derive a first dataset characterizing instances of scenario types that were encountered by the vehicle and (ii) the vehicle's second sensor system captures a second set of sensor data that is used to derive a second dataset characterizing those same instances of scenario types that were encountered by the vehicle. Once such the first and second datasets are collected in this manner, comparing the first dataset characterizing instances of scenario types that were encountered by the vehicle against the corresponding second dataset characterizing the same instances of scenario types that were encountered by the vehicle may in theory provide an indication of whether the first data being collected using the first sensor system has a sufficient level of accuracy.

Unfortunately, for the same reasons that it may not be possible to directly compare trajectories of agents that are collected using two different sensor systems on a vehicle, it also may not be possible to directly compare datasets characterizing instances of scenario types that are collected using two different sensor systems on a vehicle. Indeed, directly comparing datasets characterizing an instance of a given scenario type that have been collected using two different sensor system may generally involve (i) identifying a particular point in time at which the instance of the given scenario type occurred, (ii) deriving a first set of data values for the given scenario type's parameters at the identified point in time, (iii) deriving a second set of data values for the given scenario type's parameters at the identified point in time, and (iv) comparing the first set of data values for the given scenario type's parameters at the identified point in time to the second set of data values for the given scenario type's parameters at the identified point in time. However, in line with the discussion above, the functions of identifying the particular point in time at which the instance of the given scenario type occurred and/or deriving the data values for the given scenario type's parameters may rely on the use of trajectory information for the vehicle and/or one or more surrounding agents that is derived from the sensor data captured by the two different sensor systems—which is problematic due to the fact that trajectory information derived from sensor data captured by the two different sensor systems is often represented according to different temporal and/or spatial reference frames.

Figure 4B:
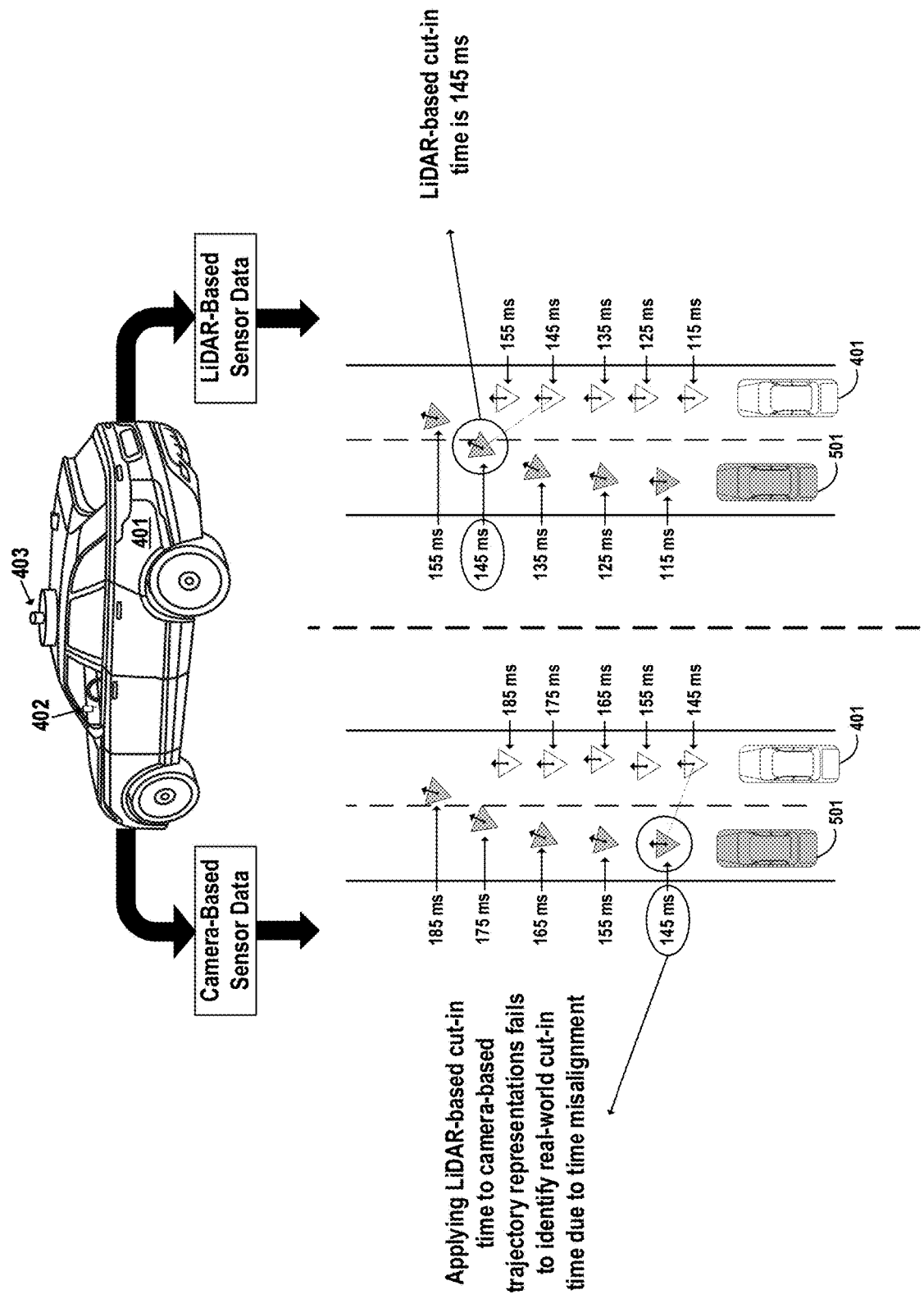
FIG. 4B is a diagram that illustrates one example of the problems that may arise when attempting to compare a first dataset characterizing an instance of a cut-in scenario type with a second dataset characterizing the same instance of the cut-in scenario type.

One possible example of the problems that may arise when attempting to compare a first dataset characterizing an instance of a cut-in scenario type that is collected using a first sensor system with a second dataset characterizing the same instance of the cut-in scenario type that is collected using a second sensor system are illustrated in FIG. 4B. As shown in FIG. 4B, an example vehicle 401 that is equipped with two different sensor systems, such as a camera-based sensor system 402 and a LiDAR-based sensor system 403, may be driven within a given area of the real world while (i) camera-based sensor system 402 captures a first set of camera-based sensor data that is used to detect and then derive a first dataset characterizing instances of the cut-in scenario type and (ii) LiDAR-based sensor system 403 captures a second set of LiDAR-based sensor data that is used to detect and then derive a second dataset characterizing instances of the cut-in scenario type. (However, it should be understood that camera-based sensor system 402 and LiDAR-based sensor system 403 are merely examples of sensor systems that are shown for purposes of illustration, and that each of sensor systems 402 and 403 may generally comprise any system of one or more sensors, embodied in any form, that is capable of capturing sensor data and/or other localization information from which a representation of a trajectory having a given level of accuracy (e.g., lane-level accuracy) can be derived—including a system comprising any one or more of a LiDAR unit, a monocular camera, a stereo camera, a GPS unit, an IMU, a SONAR unit, and/or a RADAR unit, among other possible types of sensors).

As above, trajectory information may then be derived from such sensor data for vehicle 401 and other vehicles in proximity to vehicle 401, such as vehicle 501, so that this trajectory information can then be used to facilitate the functions of detecting instances of the cut-in scenario type and deriving the data values for certain of the parameters that are used to characterize the cut-in scenario type. For example, as shown in FIG. 4B, (i) a camera-based set of trajectory representations may be derived for vehicle 401 and vehicle 501 and (ii) a LiDAR-based set of trajectory representations may be derived for vehicle 401 and vehicle 501, where each such trajectory representation comprises a respective sequence of timestamped pose values for one of the vehicles. (While FIG. 4B shows the pose values in a 2D space that represents the horizontal plane, it should be understood that the pose values included in each sequence could comprise either 2D values or 3D values).

However, despite the fact that these two sets of trajectory representations are of the same two real-world trajectories for the same two agents, it is possible that there may be categorical differences in the camera-based and LiDAR-based sets of trajectory representations that are due to differences in the temporal and/or spatial reference frames of such sets of trajectory representations. For example, FIG. 4B shows that the timestamps of the pose values included in the camera-based set of trajectory representations have an offset of +30 ms relative to the timestamps of the corresponding pose values included in the LiDAR-based set of trajectory representations, which may be due to the fact that the origin time used by camera-based sensor system 102 during capture was 30 ms earlier in time than the origin time used by LiDAR-based sensor system 103 during capture (e.g., camera-based sensor system 102 was initialized and/or began capturing sensor data 30 ms earlier than LiDAR-based sensor system 103). For example, as shown, the first pose values for vehicle 401 and 501 in the first set of trajectory representations have timestamps of 145 ms while the corresponding first pose values for vehicle 401 and 501 in the second set of trajectory representations have timestamps of 115 ms, and so on. Although not specifically shown in FIG. 4B, it should be understood that the camera-based and LiDAR-based sets of trajectory representations may also be based on different time-interval scales, different global reference frames, and/or different local reference frames as well.

These differences in the temporal and/or spatial reference frames of the camera-based and LiDAR-based sets of trajectory representations may present several problems when attempting to compare datasets characterizing an instance of the cut-in scenario type. For instance, one such problem relates to the identification of the specific cut-in time for an instance of the cut-in scenario type, which is used to extract the particular trajectory information that forms the basis for deriving the characterizing data (e.g., the position, orientation, and velocity of each of vehicles 401 and 501 at the cut-in time). In line with the discussion above, this function may generally involve an evaluation of the trajectory representations for vehicle 401 and vehicle 501 (along with lane information) to identify the particular point in time when vehicle 501 crossed into the lane of vehicle 401. However, when there are two different sets of trajectory representations for vehicle 401 and vehicle 501, this function becomes more complicated, as the cut-in time for an instance of the cut-in scenario type occurs needs to be identified according to the temporal reference frame of both the camera-based set of trajectory representations and the LiDAR-based set of trajectory representations.

In this respect, one possible way to perform this identification would be to first identify the cut-in time for an instance of the cut-in scenario type using the LiDAR-based set of trajectory representations (which is already known to have a sufficient level of accuracy) and then apply that same cut-in time to the camera-based set of trajectory representations when deriving the first dataset characterizing the instance of the cut-in scenario type. However, because of the differences in origin times associated with the camera-based and LiDAR-based sets of trajectory representations, this is not possible. Indeed, attempting to apply the same cut-in time identified using the LiDAR-based set of trajectory representations to the camera-based set of trajectory representations would result in the first dataset characterizing the instance of the cut-in scenario type being derived for a time point that is entirely different than when the cut-in actually occurred according to the temporal reference frame of the camera-based set of trajectory representations, which precludes the ability to perform a direct comparison between the first dataset characterizing the instance of the cut-in scenario type and the second dataset characterizing the instance of the cut-in scenario type. This problem is illustrated in FIG. 4B, which shows that applying the same cut-in time identified using the LiDAR-based set of trajectory representations to the camera-based set of trajectory representations would result in first dataset characterizing the instance of the cut-in scenario type being derived for a time point that is 30 ms earlier than when the cut-in actually occurred according to the temporal reference frame of the camera-based set of trajectory representations.

Figure 4C:
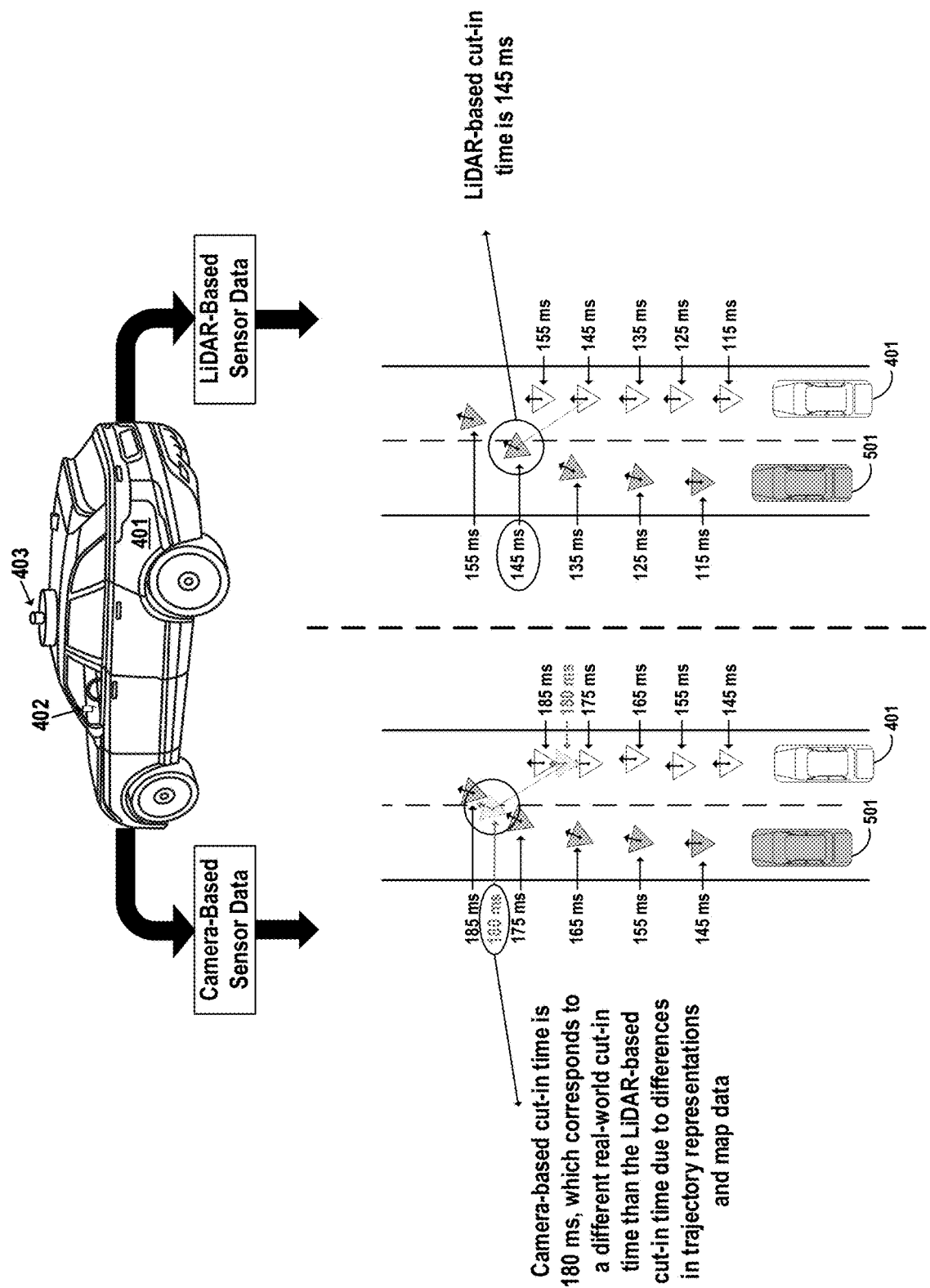
FIG. 4C is a diagram that illustrates one example of how different cut-in times for an instance of a cut-in scenario type may be identified when different representations of the vehicle trajectories are used to perform the identification.

One possible way to overcome the foregoing problem may be to independently identify a separate cut-in time to use when deriving the first dataset characterizing the instance of the cut-in scenario type by using the camera-based trajectory representation for vehicle 501 (along with lane information) to determine the time point when vehicle 501 crosses into the lane of vehicle 401 according to the temporal reference frame of the camera-based set of trajectory representations. An example of this approach is illustrated in FIG. 4C, which shows that the camera-based trajectory representation for vehicle 501 has been used to determine that the instance of the cut-in scenario type occurred at a cut-in time of 180 ms according to the temporal reference frame of the camera-based set of trajectory representations, and that this cut-in time of 180 ms is then used to extract the particular trajectory information that forms the basis for deriving the characterizing data (e.g., the position, orientation, and velocity of each of vehicles 401 and 501 at the cut-in time).

However, because there are likely to be differences between the camera-based and LiDAR-based trajectory representations for vehicle 501 (e.g., due to accuracy differences in the camera-based and LiDAR-based sensor data) and perhaps also differences in the maps that are used to evaluate the camera-based and LiDAR-based trajectory representations, the cut-in time that is identified using the camera-based trajectory representation for vehicle 501 may still not align exactly with the cut-in time that is identified using the LiDAR-based trajectory representation for vehicle 501, which means that a comparison between the first dataset characterizing the instance of the cut-in scenario type and the second dataset characterizing the instance of the cut-in scenario type may still suffer from a lack of precision that could degrade the reliability of the evaluation. For example, as shown in FIG. 4C, the 180 ms cut-in time identified using the camera-based trajectory representation for vehicle 501 corresponds to a real-world cut-in time that is 5 ms later than the real-world cut-in time that corresponds to the 145 ms cut-in time identified using the LiDAR-based trajectory representation for vehicle 501.

Moreover, depending on the particular scenario type to be detected and/or the particular parameters used to characterize the scenario type, it is possible that the differences in temporal and/or spatial reference frames may present other problems when attempting to compare first data characterizing an instance of the cut-in scenario type with second dataset characterizing the same instance of the cut-in scenario type.

Accordingly, before the first dataset characterizing instances of a scenario type that is collected using a vehicle's first sensor system can be evaluated against the second dataset characterizing such instances of the scenario type that is collected using the vehicle's second sensor system, the differences between the temporal and/or spatial reference frames of any trajectory representations used to derive such data may need to be reconciled. In this respect, as discussed above, aspects of the disclosed technique for aligning different representations of an agent's real-world trajectory that are based on different temporal and/or spatial reference frames (e.g., representations of an agent's real-world trajectory that are derived from different source data) may be used to satisfy this need.

For example, referring again to the instance of the cut-in scenario type illustrated in FIG. 4B, aspects of the disclosed technique could be used to align the camera-based and LiDAR-based trajectory representations for vehicle 401 and the camera-based and LiDAR-based trajectory representations for vehicle 501 in a similar manner to that described above. For instance, aligning the camera-based and LiDAR-based trajectory representations for vehicle 401 may involve at least the functions of (i) adjusting the global reference frame of the camera-based trajectory representation for vehicle 401 to an alignment that achieves the best match between the geometric shape defined by the camera-based sequence of pose values for vehicle 401 and the geometric shape defined by the LiDAR-based sequence of pose values for vehicle 401 and then (ii) determining a time offset between the timestamps of the camera-based and LiDAR-based sequences that minimizes the positional error between the camera-based and LiDAR-based sequences of pose values for vehicle 401 within the global reference frame. Likewise, aligning the camera-based and LiDAR-based trajectory representations for vehicle 501 may involve at least the functions of (i) adjusting the global reference frame of the camera-based trajectory representation for vehicle 501 to an alignment that achieves the best match between the geometric shape defined by the camera-based sequence of pose values for vehicle 501 and the geometric shape defined by the LiDAR-based sequence of pose values for vehicle 501 and then (ii) determining a time offset between the timestamps of the camera-based and LiDAR-based sequences that minimizes the positional error between the camera-based and LiDAR-based sequences of pose values for vehicle 501 within the global reference frame.

It should be understood that other aspects of the disclosed technique could be used to align the camera-based and LiDAR-based sets of trajectory representations for vehicle 401 and vehicle 501 as well. For example, if the camera-based set of trajectory representations for vehicle 401 and vehicle 501 has a different time-interval scale than the LiDAR-based set of trajectory representations for vehicle 401 and vehicle 501, then aligning such sets of trajectory representations may additionally involve an alignment of time-interval scales in the manner described above. As another example, if the functions of detecting the instances of a scenario type and/or deriving the datasets characterizing the scenario type are impacted by the local reference frames of the pose values for vehicle 401 and vehicle 501, then aligning such sets of trajectory representations may additionally involve an alignment of local reference frames in the manner described above.

Figure 4D:
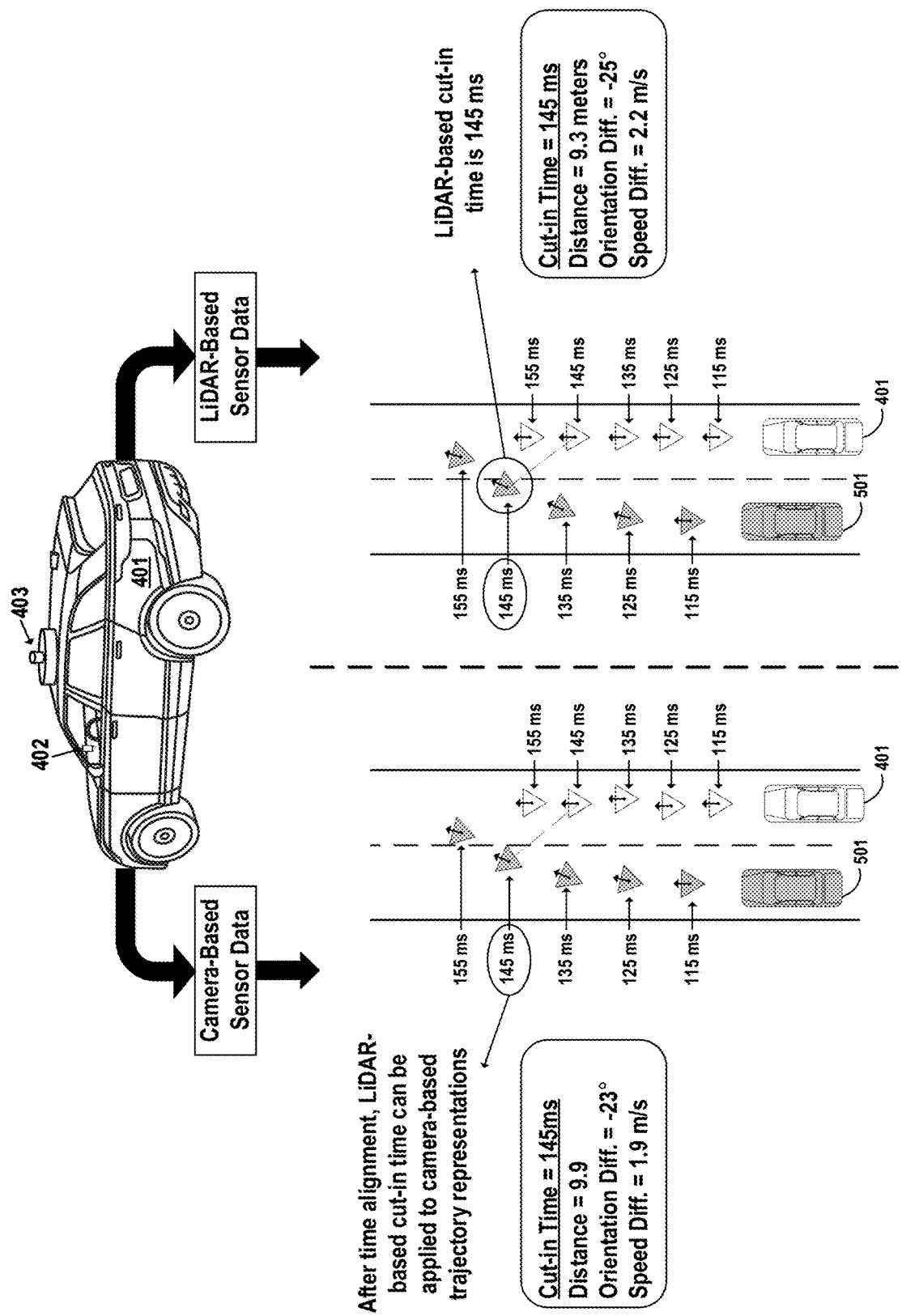
FIG. 4D is a diagram that illustrates one example of how the disclosed technique can be used to perform a more accurate comparison between a first dataset characterizing an instance of a scenario type and a second dataset characterizing the instance of the scenario type.

Once the temporal and/or spatial reference frames of the camera-based and LiDAR-based sets of trajectory representations have been aligned, such trajectory representations can then be used to perform a more accurate comparison between the first dataset characterizing instances of scenario types and the second dataset characterizing instances of scenario types. For instance, because the camera-based and LiDAR-based sets of trajectory representations have been aligned in time, the cut-in time that is identified using the LiDAR-based set of trajectory representations can be applied to the camera-based set of trajectory representations when deriving the dataset characterizing the instance of the cut-in scenario type. One example of this functionality is illustrated in FIG. 4D, which shows that a cut-in time of 145 ms is first identified using the LiDAR-based set of trajectory representations and can then be applied to the camera-based set of trajectory representations due to the fact that the disclosed technique has been used to align the camera-based set of trajectory representations in time with the LiDAR-based set of trajectory representations. In turn, first data characterizing the instance of the cut-in scenario type can be (i) derived using information extracted from the camera-based set of trajectory representations for the cut-in time of 145 ms and then (ii) compared to the second dataset characterizing the instance of the cut-in scenario type that is derived using information extracted from the LiDAR-based set of trajectory representations for the cut-in time of 145 ms, which may achieve a more precise evaluation of the first data.

After a sufficient sample size of data characterizing a given scenario type has been collected in the manner described above, that data can then be used to evaluate whether the first approach for collecting data characterizing the given scenario type is sufficiently accurate. This evaluation may take various forms.

For instance, as one possibility, evaluating whether the first approach for collecting data characterizing a given scenario type is sufficiently accurate may involve: (i) based on the first dataset characterizing the given scenario type, generating a respective "first" probability distribution for each parameter that is used to characterize the scenario type, (ii) based on the second dataset characterizing the given scenario type, generating a respective second probability distribution for each parameter that is used to characterize the scenario type, (iii) comparing the first probability distribution for each parameter to the corresponding second probability distribution for the parameter, and (iv) based on the comparison, extracting insights regarding the ability of the first approach to accurately collect data characterizing the given scenario type. In this respect, the comparison between the first and second probability distributions for each parameter may take any of various forms, examples of which may include a point-by-point comparison between the first and second probability distributions for a given parameter and/or a comparison using a statistical test such as the Kolmogorov-Smirnov test. Likewise, the insights that are extracted based on the comparison may take any of various forms, examples of which may include a set of error values that quantify the parameter-by-parameter error between the first and second probability distributions across the entirety of the distributions and/or a set of error values that quantify the parameter-by-parameter error between the first and second probability distributions at one or more reference points along the probability distributions (e.g., the median point and/or the P90 point), among other possibilities.

Figure 5A:
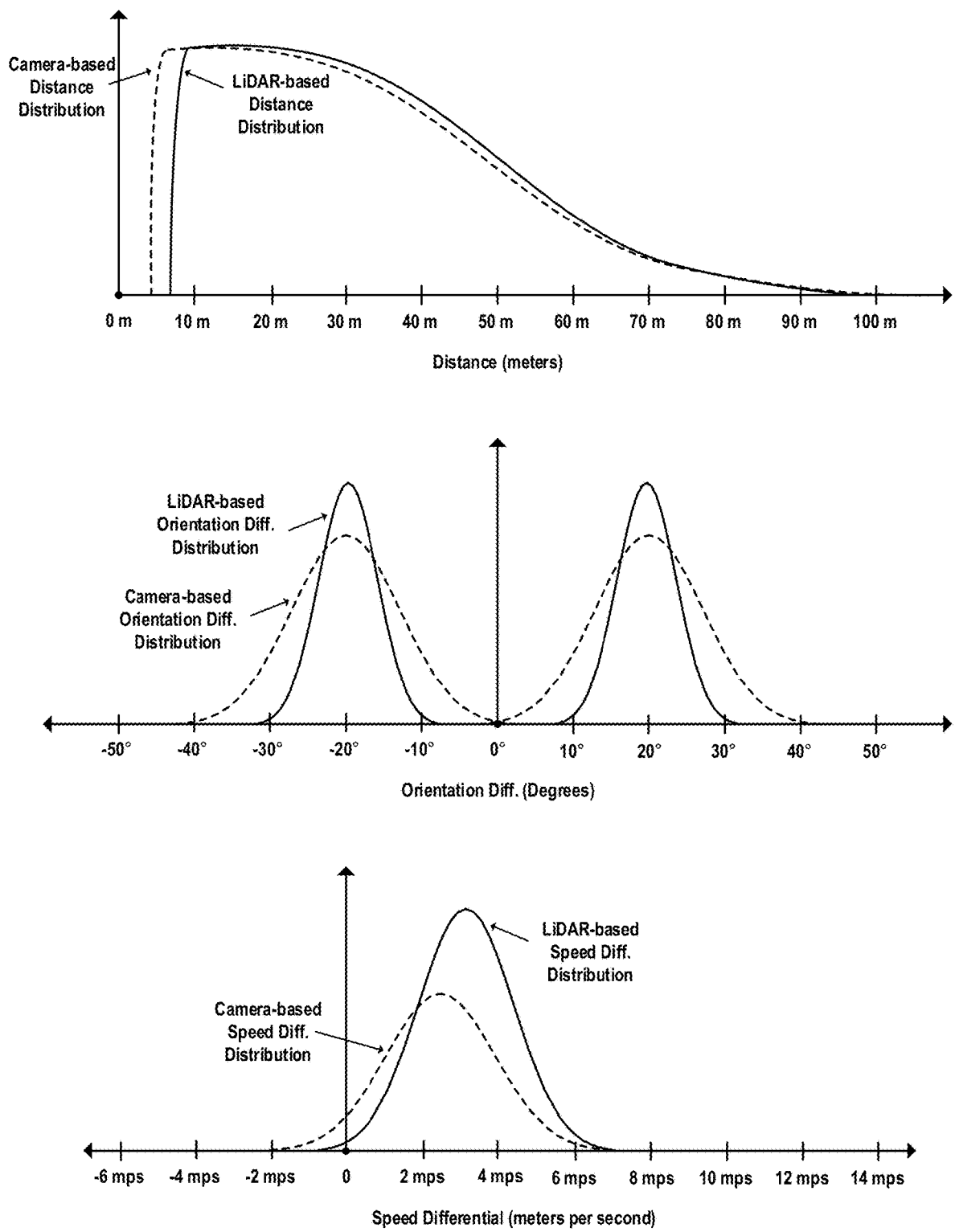
FIG. 5A is a diagram that illustrates one example of first and second sets of probability distributions that may be generated for a cut-in scenario type in accordance with the present disclosure.

One example of first and second sets of probability distributions that may be generated for a cut-in scenario type are illustrated in FIG. 5A. As shown in FIG. 5A, first and second sets of probability distributions may comprise probability distributions that have been generated for three characterizing parameters: (i) distance between the vehicle and the cut-in vehicle at the cut-in time, (ii) orientation differential between the vehicle and the cut-in vehicle at the cut-in time, and (iii) speed differential between the vehicle and the cut-in vehicle at the cut-in time. Further, as shown in FIG. 5A, the first set of probability distributions may have been generated based on sensor data captured by a camera-based sensor system and the second set of probability distributions may have been generated based on sensor data captured by a LiDAR-based sensor system. However, it should be understood that the first and second sets of probability distributions may be generated based on sensor data captured by various other sensor systems as well.

Beginning with the top graph, a visual comparison is provided between (i) a camera-based distribution for the distance parameter (denoted using a dotted line) that has been generated based on a first, camera-based dataset characterizing the cut-in scenario type and (ii) a LiDAR-based distribution for the distance parameter (denoted using a solid line) that has been generated based on a second, LiDAR-based dataset characterizing the cut-in scenario type.

Further, the middle graph provides a visual comparison between (i) a camera-based distribution for the orientation-differential parameter (denoted using a dotted line) that has been generated based on the first, camera-based dataset characterizing the cut-in scenario type and (ii) a LiDAR-based distribution for the orientation-differential parameter (denoted using a solid line) that has been generated based on the second, LiDAR-based dataset characterizing the cut-in scenario type.

Further yet, the bottom graph provides a visual comparison between (i) a camera-based distribution for the speed-differential parameter (denoted using a dotted line) that has been generated based on the first, camera-based dataset characterizing the cut-in scenario type and (ii) a LiDAR-based distribution for the speed-differential parameter (denoted using a solid line) that has been generated based on the second, LiDAR-based dataset characterizing the cut-in scenario type.

Based on these probability distributions, insights may then be exacted regarding the ability of the first approach to accurately collect data characterizing the cut-in scenario type. For instance, the difference between the camera-based and LiDAR-based probability distributions for each parameter could be quantified in terms of an error value for each parameter, which may in turn be evaluated for purposes of determining whether the first approach for collecting data characterizing the cut-in scenario type using a camera-based sensor system is sufficiently accurate. For example, if the error value for each parameter falls below a threshold level of error (which could either be the same across all parameters or be different for different parameters), then it may be determined that the first approach for collecting data characterizing the cut-in scenario type using a camera-based sensor system is sufficiently accurate. As another example, if the error value for one or more parameters exceeds a threshold level of error (which could either be the same across all parameters or be different for different parameters), then it may be determined that the first approach for collecting data characterizing the cut-in scenario type using a camera-based sensor system is not sufficiently accurate. The form of the insights that are extracted and the manner in which these insights are used to evaluate the first approach for collecting data characterizing the cut-in scenario type could take various other forms as well. Further, as noted above, the first approach for collecting data characterizing the cut-in scenario type could make use of various other types of sensor systems.

Figure 5B:
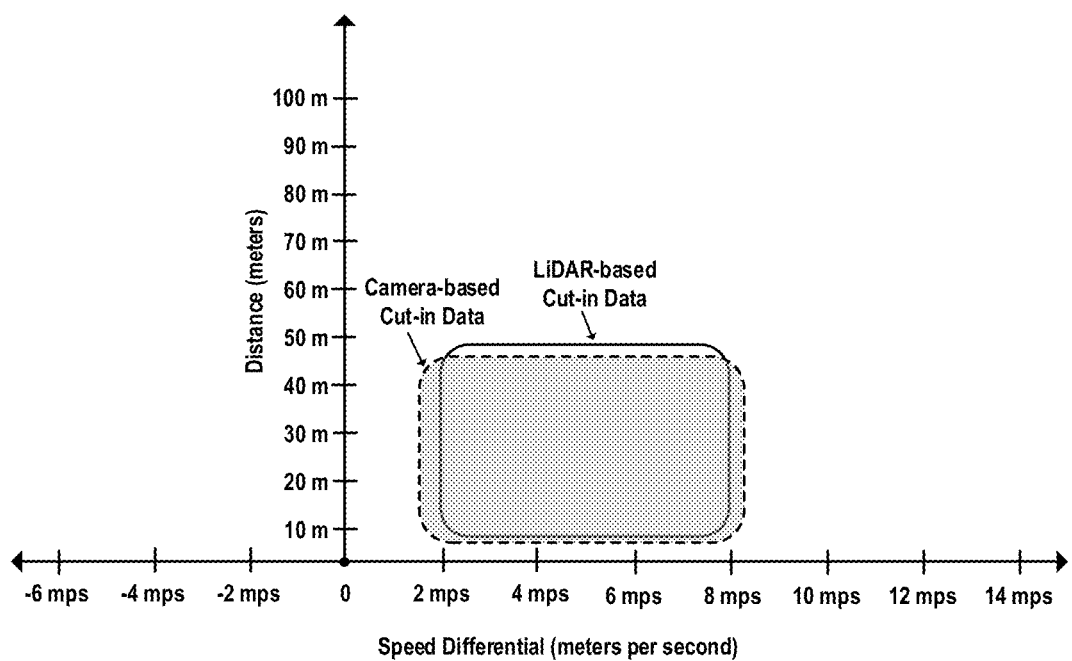
FIG. 5B is a diagram that illustrates another possible way that first and second sets of probability distributions for a cut-in scenario type can be visualized and evaluated in accordance with the present disclosure.

FIG. 5B illustrates another possible way that the first and second sets of probability distributions for a cut-in scenario type can be visualized and evaluated. In FIG. 5B, a two-dimensional plot is shown where (i) the x-axis represents the speed differential between the vehicle and the cut-in vehicle at the cut-in time and (ii) the y-axis represents the distance between the vehicle and the cut-in vehicle at the cut-in time. (While only two of the three example parameters that characterize a cut-in scenario type are shown in this graph for simplicity, it should be understood that additional dimensions may be included in this graph in order to visualize and evaluate all three of the example parameters that characterize a cut-in scenario type).

Within this two-dimensional plot, two areas are shown: (i) a first area (denoted using a dotted line and gray shading) that encompasses the representative ranges of values for the speed-differential and distance parameters that were derived for the cut-in scenario type based on sensor data captured by camera-based sensor systems and (ii) a second area (denoted using a solid line) that encompasses the representative ranges of values for the speed-differential and distance parameters that were derived for the cut-in scenario type based on sensor data captured by LiDAR-based sensor systems. In this respect, the representative ranges of values for the speed-differential and distance parameters may be determined based on the probability distributions for such parameters, and may take various forms. For example, the representative range of values for a given parameter may be defined as the range of values between two reference points along the given parameter's probability distribution, such as the range of values between the P90 and P10 points along the given parameter's distribution or the range of values that are +/−3 standard deviations from the mean point of the given parameter's distribution, among various other possibilities.

Based on this two-dimensional plot, insights can then be exacted regarding the ability of the first approach to accurately collect data characterizing the cut-in scenario type using a camera-based sensor system. For instance, the difference between the two illustrated a could be quantified in terms of an error value, which may in turn be evaluated for purposes of determining whether the first approach for collecting data characterizing the cut-in scenario type using a camera-based sensor system is sufficiently accurate.

The function of evaluating whether the first approach for collecting data characterizing the given scenario type is sufficiently accurate may take various other forms as well.

After evaluating a new approach for collecting data characterizing scenario types using the foregoing framework, the results of the evaluation may then be used to inform decision-making regarding the new approach for collecting data characterizing scenario types. Indeed, if the results of the evaluation indicate that the new approach is capable of accurately collecting data characterizing a select group of scenario types, then these results may lead to use of the new approach for collecting data characterizing that select group of scenario types. For example, if the new approach uses vehicles equipped with lower-fidelity sensor systems to collect data characterizing scenario types, then sensor data captured by vehicles having such sensor systems may be obtained and used to detect instances of the particular group of scenario types and then derive a respective dataset characterizing each detected instance of the particular group of scenario types.

In line with the discussion above, this ability to confidently validate the use of vehicles having lower-fidelity sensor systems to collect data characterizing the select group of scenario types may allow such data to be collected on a much larger scale than such data can be collected today, which may provide several advantages. First, collecting data characterizing the select group of scenario types on a larger scale may lead to a discovery that the probability distributions for the characterizing parameters of certain scenario types look different than the probability distributions that were previously generated based on data collected on a smaller scale using vehicles equipped with high-fidelity sensor systems, which may be due to the fact that such vehicles could only be operated in a limited subset of geographic areas that did not allow for data collection across the full range of different circumstances that could potentially be faced by a vehicle.

Figure 5C:
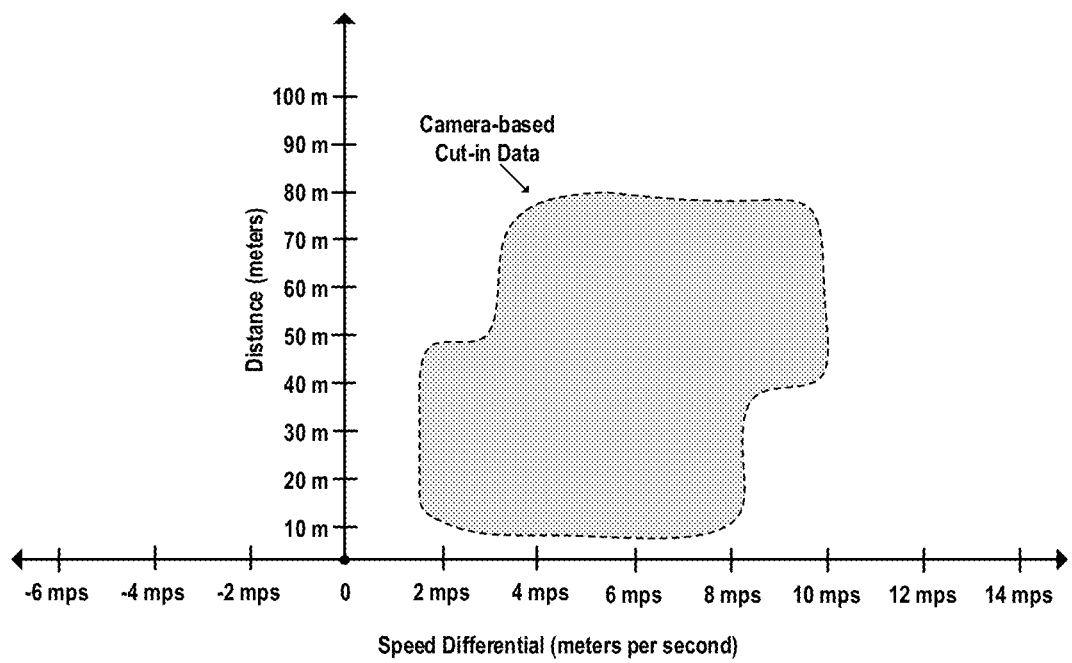
FIG. 5C is a diagram that illustrates one example of data characterizing a cut-in scenario type that has been collected on a larger scale using an approach that was evaluated and validated in accordance with the present disclosure.

One example of how the probability distributions for characterizing parameters of a scenario type could change when data is collected on a larger scale is illustrated in FIG. 5C, which is a further progression of the example that was previously shown and described above with reference to FIG. 5B. In particular, if an evaluation performed based on the characterizing data represented in the two-dimensional plot illustrated in FIG. 5B results in a determination that the first approach for collecting data characterizing the cut-in scenario type using a camera-based sensor system is sufficiently accurate, that first approach may then be used to collect data characterizing the cut-in scenario type on a larger scale than was previously possible. In turn, this larger-scale collection of data characterizing the cut-in scenario type may reveal that the representative ranges of values for the characterizing parameters of the cut-in scenario type are actually different than those that were previously determined based on the smaller-scale collection of data characterizing the cut-in scenario type. To illustrate this difference, FIG. 5C depicts an updated version of the two-dimensional plot of FIG. 5B showing a new area (denoted using a dotted line and gray shading) that encompasses the representative ranges of values for the speed-differential and distance parameters that were collected on a larger scale using vehicles that have camera-based sensor systems. Based on this updated two-dimensional plot, it can be seen that area encompasses an entirely new region of values for the speed-differential and distance parameters that were not previously encompassed by the areas shown in FIG. 5B, which indicates that there are other circumstances during which instances of cut-in scenario types may occur (e.g., circumstances when the cut-in vehicle is at farther distances and/or traveling at higher speeds) that were not previously being accounted for when collecting data on a smaller scale using vehicles equipped with LIDAR-based sensor systems.

Advantageously, this ability to generate more complete probability distributions for the characterizing parameters of certain scenario types may lead to improvements in the types of map data, machine learning models, and/or simulations that are described above.

Second, collecting data characterizing the select group of scenario types on a larger scale may expand the ability to identify areas in the world where scenario types of interest are frequently encountered, which may in turn improve the ability to encode scenario-type information into the types of map data described above.

Having the ability to confidently validate and use vehicles having lower-fidelity sensor systems to collect data characterizing scenario types on a larger scale may provide other advantages as well.

On the other hand, if the results of evaluating the new approach using the foregoing framework indicate that the new approach is not capable of accurately collecting data characterizing all scenario types of interest, then these results may be used to inform further development of the new approach's underlying technology in order to achieve better accuracy. For instance, if the results of the evaluation may indicate that the new approach consistently fails to detect instances of a given scenario type due to limitations in the field of view and/or resolution of the sensor system used by the new approach, then these results may lead to further development of the sensor systems that are used by the new approach to collect data characterizing scenario types.

The results of evaluating the new approach using the foregoing framework may be used for various other purposes as well.

Figure 6:
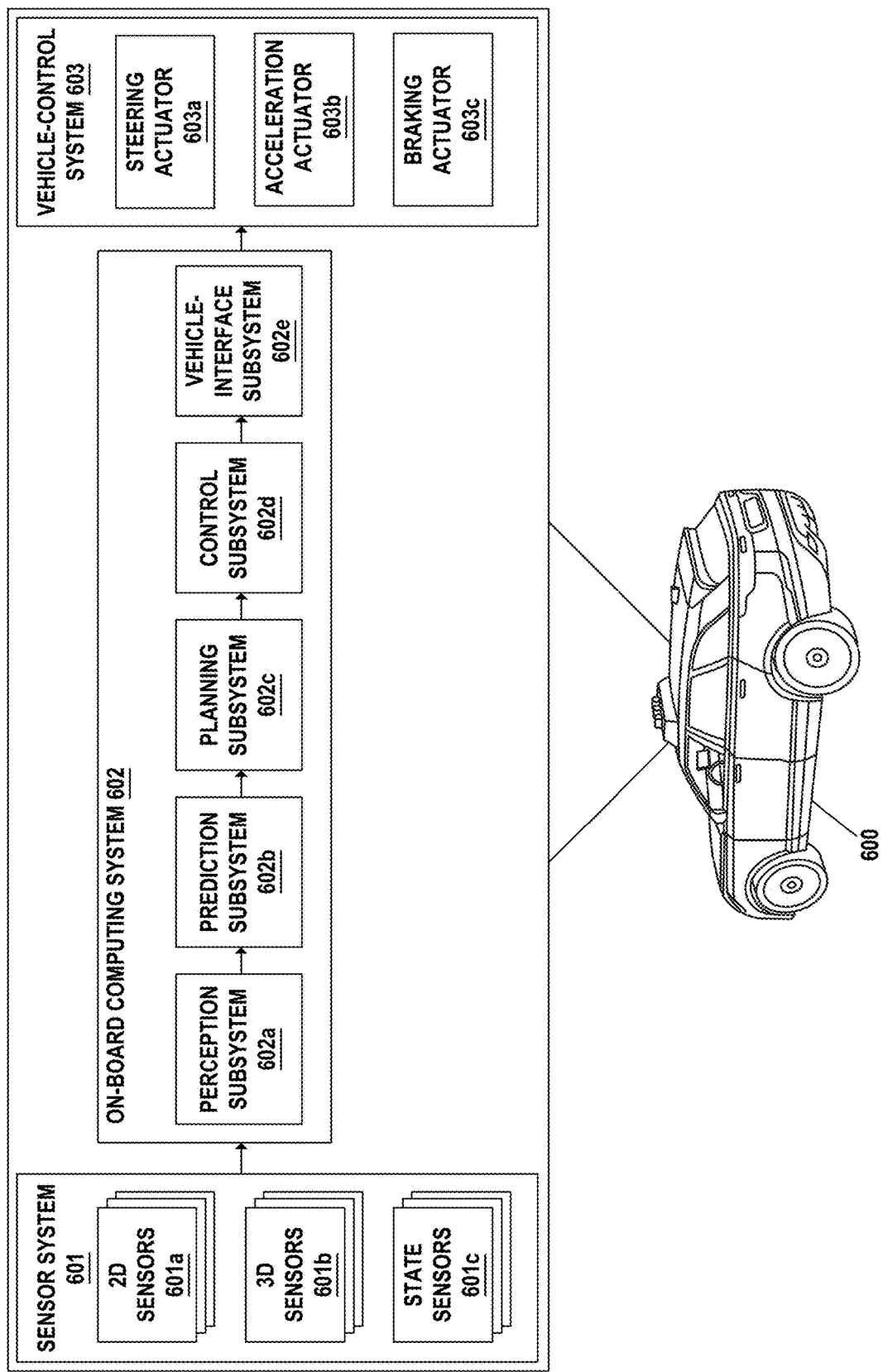
FIG. 6 is a simplified block diagram that illustrates certain systems that may be included in an example vehicle.

Turning now to FIG. 6, a simplified block diagram is provided to illustrate certain systems that may be included in an example vehicle 600. As shown, at a high level, vehicle 600 may include at least (i) a sensor system 601 that is configured to capture sensor data that is representative of the real-world environment being perceived by the vehicle (i.e., the vehicle's "surrounding environment") and/or the vehicle's operation within that real-world environment, (ii) an on-board computing system 602 that is configured to perform functions related to autonomous operation of vehicle 600 (and perhaps other functions as well), and (iii) a vehicle-control system 603 that is configured to control the physical operation of vehicle 600, among other possibilities. Each of these systems may take various forms.

In general, sensor system 601 may comprise any of various different types of sensors, each of which is generally configured to detect one or more particular stimuli based on vehicle 600 operating in a real-world environment. The sensors then output sensor data that is indicative of one or more measured values of the one or more stimuli at one or more capture times (which may each comprise a single instant of time or a range of times).

For instance, as one possibility, sensor system 601 may include one or more 2D sensors 601a that are each configured to capture 2D data that is representative of the vehicle's surrounding environment. Examples of 2D sensor(s) 601a may include a single 2D camera, a 2D camera array, a 2D RADAR unit, a 2D SONAR unit, a 2D ultrasound unit, a 2D scanner, and/or 2D sensors equipped with visible-light and/or infrared sensing capabilities, among other possibilities. Further, in an example implementation, 2D sensor(s) 601a may have an arrangement that is capable of capturing 2D sensor data representing a 360° view of the vehicle's surrounding environment, one example of which may take the form of an array of 6-7 cameras that each have a different capture angle. Other 2D sensor arrangements are also possible.

As another possibility, sensor system 601 may include one or more 3D sensors 601b that are each configured to capture 3D data that is representative of the vehicle's surrounding environment. Examples of 3D sensor(s) 601b may include a LiDAR unit, a 3D RADAR unit, a 3D SONAR unit, a 3D ultrasound unit, and a camera array equipped for stereo vision, among other possibilities. Further, in an example implementation, 3D sensor(s) 601b may comprise an arrangement that is capable of capturing 3D sensor data representing a 360° view of the vehicle's surrounding environment, one example of which may take the form of a LiDAR unit that is configured to rotate 360° around its installation axis. Other 3D sensor arrangements are also possible.

As yet another possibility, sensor system 601 may include one or more state sensors 601c that are each configured to detect aspects of the vehicle's current state, such as the vehicle's current position, current orientation (e.g., heading/yaw, pitch, and/or roll), current velocity, and/or current acceleration of vehicle 600. Examples of state sensor(s) 601c may include an IMU (which may be comprised of accelerometers, gyroscopes, and/or magnetometers), an Inertial Navigation System (INS), a Global Navigation Satellite System (GNSS) unit such as a GPS unit, among other possibilities.

Sensor system 601 may include various other types of sensors as well.

In turn, on-board computing system 602 may generally comprise any computing system that includes at least a communication interface, a processor, and data storage, where such components may either be part of a single physical computing device or be distributed across a plurality of physical computing devices that are interconnected together via a communication link. Each of these components may take various forms.

For instance, the communication interface of on-board computing system 602 may take the form of any one or more interfaces that facilitate communication with other systems of vehicle 600 (e.g., sensor system 601, vehicle-control system 603, etc.) and/or remote computing systems (e.g., a transportation-matching system), among other possibilities. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols.

Further, the processor of on-board computing system 602 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

Further yet, the data storage of on-board computing system 602 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the processor of on-board computing system 602 such that on-board computing system 602 is configured to perform various functions related to the autonomous operation of vehicle 600 (among other possible functions), and (ii) data that may be obtained, derived, or otherwise stored by on-board computing system 602.

In one embodiment, on-board computing system 602 may also be functionally configured into a number of different subsystems that are each tasked with performing a specific subset of functions that facilitate the autonomous operation of vehicle 600, and these subsystems may be collectively referred to as the vehicle's "autonomy system." In practice, each of these subsystems may be implemented in the form of program instructions that are stored in the on-board computing system's data storage and are executable by the on-board computing system's processor to carry out the subsystem's specific subset of functions, although other implementations are possible as well—including the possibility that different subsystems could be implemented via different hardware components of on-board computing system 602.

As shown in FIG. 6, in one embodiment, the functional subsystems of on-board computing system 602 may include (i) a perception subsystem 602a that generally functions to derive a representation of the surrounding environment being perceived by vehicle 600, (ii) a prediction subsystem 602b that generally functions to predict the future state of each object detected in the vehicle's surrounding environment, (iii) a planning subsystem 602c that generally functions to derive a behavior plan for vehicle 600, (iv) a control subsystem 602d that generally functions to transform the behavior plan for vehicle 600 into control signals for causing vehicle 600 to execute the behavior plan, and (v) a vehicle-interface subsystem 602e that generally functions to translate the control signals into a format that vehicle-control system 603 can interpret and execute. However, it should be understood that the functional subsystems of on-board computing system 602 may take various other forms as well. Each of these example subsystems will now be described in further detail below.

For instance, the subsystems of on-board computing system 602 may begin with perception subsystem 602a, which may be configured to fuse together various different types of "raw" data that relate to the vehicle's perception of its surrounding environment and thereby derive a representation of the surrounding environment being perceived by vehicle 600. In this respect, the "raw" data that is used by perception subsystem 602a to derive the representation of the vehicle's surrounding environment may take any of various forms.

For instance, at a minimum, the "raw" data that is used by perception subsystem 602a may include multiple different types of sensor data captured by sensor system 601, such as 2D sensor data (e.g., image data) that provides a 2D representation of the vehicle's surrounding environment, 3D sensor data (e.g., LIDAR data) that provides a 3D representation of the vehicle's surrounding environment, and/or state data for vehicle 600 that indicates the past and current position, orientation, velocity, and acceleration of vehicle 600. Additionally, the "raw" data that is used by perception subsystem 602a may include map data associated with the vehicle's location, such as high-definition geometric and/or semantic map data, which may be preloaded onto on-board computing system 602 and/or obtained from a remote computing system. Additionally yet, the "raw" data that is used by perception subsystem 602a may include navigation data for vehicle 600 that indicates a specified origin and/or specified destination for vehicle 600, which may be obtained from a remote computing system (e.g., a transportation-matching system) and/or input by a human riding in vehicle 600 via a user-interface component that is communicatively coupled to on-board computing system 602. Additionally still, the "raw" data that is used by perception subsystem 602a may include other types of data that may provide context for the vehicle's perception of its surrounding environment, such as weather data and/or traffic data, which may be obtained from a remote computing system. The "raw" data that is used by perception subsystem 602a may include other types of data as well.

Advantageously, by fusing together multiple different types of raw data (e.g., both 2D sensor data and 3D sensor data), perception subsystem 602a is able to leverage the relative strengths of these different types of raw data in a way that may produce a more accurate and precise representation of the surrounding environment being perceived by vehicle 600.

Further, the function of deriving the representation of the surrounding environment perceived by vehicle 600 using the raw data may include various aspects. For instance, one aspect of deriving the representation of the surrounding environment perceived by vehicle 600 using the raw data may involve determining a current state of vehicle 600 itself, such as a current position, a current orientation, a current velocity, and/or a current acceleration, among other possibilities. In this respect, perception subsystem 602a may also employ a localization technique such as SLAM to assist in the determination of the vehicle's current position and/or orientation. (Alternatively, it is possible that on-board computing system 602 may run a separate localization service that determines position and/or orientation values for vehicle 600 based on raw data, in which case these position and/or orientation values may serve as another input to perception subsystem 602a).

Another aspect of deriving the representation of the surrounding environment perceived by vehicle 600 using the raw data may involve detecting objects within the vehicle's surrounding environment, which may result in the determination of class labels, bounding boxes, or the like for each detected object. In this respect, the particular classes of objects that are detected by perception subsystem 602a (which may be referred to as "agents") may take various forms, including both (i) "dynamic" objects that have the potential to move, such as vehicles, cyclists, pedestrians, and animals, among other examples, and (ii) "static" objects that generally do not have the potential to move, such as streets, curbs, lane markings, traffic lights, stop signs, and buildings, among other examples. Further, in practice, perception subsystem 602a may be configured to detect objects within the vehicle's surrounding environment using any type of object detection model now known or later developed, including but not limited object detection models based on convolutional neural networks (CNN).

Yet another aspect of deriving the representation of the surrounding environment perceived by vehicle 600 using the raw data may involve determining a current state of each object detected in the vehicle's surrounding environment, such as a current position (which could be reflected in terms of coordinates and/or in terms of a distance and direction from vehicle 600), a current orientation, a current velocity, and/or a current acceleration of each detected object, among other possibilities. In this respect, the current state of each detected object may be determined either in terms of an absolute measurement system or in terms of a relative measurement system that is defined relative to a state of vehicle 600, among other possibilities.

The function of deriving the representation of the surrounding environment perceived by vehicle 600 using the raw data may include other aspects as well.

Further yet, the derived representation of the surrounding environment perceived by vehicle 600 may incorporate various different information about the surrounding environment perceived by vehicle 600, examples of which may include (i) a respective set of information for each object detected in the vehicle's surrounding, such as a class label, a bounding box, and/or state information for each detected object, (ii) a set of information for vehicle 600 itself, such as state information and/or navigation information (e.g., a specified destination), and/or (iii) other semantic information about the surrounding environment (e.g., time of day, weather conditions, traffic conditions, etc.). The derived representation of the surrounding environment perceived by vehicle 600 may incorporate other types of information about the surrounding environment perceived by vehicle 600 as well.

Still further, the derived representation of the surrounding environment perceived by vehicle 600 may be embodied in various forms. For instance, as one possibility, the derived representation of the surrounding environment perceived by vehicle 600 may be embodied in the form of a data structure that represents the surrounding environment perceived by vehicle 600, which may comprise respective data arrays (e.g., vectors) that contain information about the objects detected in the surrounding environment perceived by vehicle 600, a data array that contains information about vehicle 600, and/or one or more data arrays that contain other semantic information about the surrounding environment. Such a data structure may be referred to as a "parameter-based encoding."

As another possibility, the derived representation of the surrounding environment perceived by vehicle 600 may be embodied in the form of a rasterized image that represents the surrounding environment perceived by vehicle 600 in the form of colored pixels. In this respect, the rasterized image may represent the surrounding environment perceived by vehicle 600 from various different visual perspectives, examples of which may include a "top down" view and a "bird's eye" view of the surrounding environment, among other possibilities. Further, in the rasterized image, the objects detected in the surrounding environment of vehicle 600 (and perhaps vehicle 600 itself) could be shown as color-coded bitmasks and/or bounding boxes, among other possibilities.

The derived representation of the surrounding environment perceived by vehicle 600 may be embodied in other forms as well.

As shown, perception subsystem 602a may pass its derived representation of the vehicle's surrounding environment to prediction subsystem 602b. In turn, prediction subsystem 602b may be configured to use the derived representation of the vehicle's surrounding environment (and perhaps other data) to predict a future state of each object detected in the vehicle's surrounding environment at one or more future times (e.g., at each second over the next 5 seconds)—which may enable vehicle 600 to anticipate how the real-world objects in its surrounding environment are likely to behave in the future and then plan its behavior in a way that accounts for this future behavior.

Prediction subsystem 602b may be configured to predict various aspects of a detected object's future state, examples of which may include a predicted future position of the detected object, a predicted future orientation of the detected object, a predicted future velocity of the detected object, and/or predicted future acceleration of the detected object, among other possibilities. In this respect, if prediction subsystem 602b is configured to predict this type of future state information for a detected object at multiple future times, such a time sequence of future states may collectively define a predicted future trajectory of the detected object. Further, in some embodiments, prediction subsystem 602b could be configured to predict multiple different possibilities of future states for a detected object (e.g., by predicting the 3 most-likely future trajectories of the detected object). Prediction subsystem 602b may be configured to predict other aspects of a detected object's future behavior as well.

In practice, prediction subsystem 602b may predict a future state of an object detected in the vehicle's surrounding environment in various manners, which may depend in part on the type of detected object. For instance, as one possibility, prediction subsystem 602b may predict the future state of a detected object using a data science model that is configured to (i) receive input data that includes one or more derived representations output by perception subsystem 602a at one or more perception times (e.g., the "current" perception time and perhaps also one or more prior perception times), (ii) based on an evaluation of the input data, which includes state information for the objects detected in the vehicle's surrounding environment at the one or more perception times, predict at least one likely time sequence of future states of the detected object (e.g., at least one likely future trajectory of the detected object), and (iii) output an indicator of the at least one likely time sequence of future states of the detected object. This type of data science model may be referred to herein as a "future-state model."

Such a future-state model will typically be created by an off-board computing system (e.g., a backend platform) and then loaded onto on-board computing system 602, although it is possible that a future-state model could be created by on-board computing system 602 itself. Either way, the future-state model may be created using any modeling technique now known or later developed, including but not limited to a machine-learning technique that may be used to iteratively "train" the data science model to predict a likely time sequence of future states of an object based on training data. The training data may comprise both test data (e.g., historical representations of surrounding environments at certain historical perception times) and associated ground-truth data (e.g., historical state data that indicates the actual states of objects in the surrounding environments during some window of time following the historical perception times).

Prediction subsystem 602b could predict the future state of a detected object in other manners as well. For instance, for detected objects that have been classified by perception subsystem 602a as belonging to certain classes of static objects (e.g., roads, curbs, lane markings, etc.), which generally do not have the potential to move, prediction subsystem 602b may rely on this classification as a basis for predicting that the future state of the detected object will remain the same at each of the one or more future times (in which case the state-prediction model may not be used for such detected objects). However, it should be understood that detected objects may be classified by perception subsystem 602a as belonging to other classes of static objects that have the potential to change state despite not having the potential to move, in which case prediction subsystem 602b may still use a future-state model to predict the future state of such detected objects. One example of a static object class that falls within this category is a traffic light, which generally does not have the potential to move but may nevertheless have the potential to change states (e.g. between green, yellow, and red) while being perceived by vehicle 600.

After predicting the future state of each object detected in the surrounding environment perceived by vehicle 600 at one or more future times, prediction subsystem 602b may then either incorporate this predicted state information into the previously-derived representation of the vehicle's surrounding environment (e.g., by adding data arrays to the data structure that represents the surrounding environment) or derive a separate representation of the vehicle's surrounding environment that incorporates the predicted state information for the detected objects, among other possibilities.

As shown, prediction subsystem 602b may pass the one or more derived representations of the vehicle's surrounding environment to planning subsystem 602c. In turn, planning subsystem 602c may be configured to use the one or more derived representations of the vehicle's surrounding environment (and perhaps other data) to derive a behavior plan for vehicle 600, which defines the desired driving behavior of vehicle 600 for some future period of time (e.g., the next 5 seconds).

The behavior plan that is derived for vehicle 600 may take various forms. For instance, as one possibility, the derived behavior plan for vehicle 600 may comprise a planned trajectory for vehicle 600 that specifies a planned state of vehicle 600 at each of one or more future times (e.g., each second over the next 5 seconds), where the planned state for each future time may include a planned position of vehicle 600 at the future time, a planned orientation of vehicle 600 at the future time, a planned velocity of vehicle 600 at the future time, and/or a planned acceleration of vehicle 600 (whether positive or negative) at the future time, among other possible types of state information. As another possibility, the derived behavior plan for vehicle 600 may comprise one or more planned actions that are to be performed by vehicle 600 during the future window of time, where each planned action is defined in terms of the type of action to be performed by vehicle 600 and a time and/or location at which vehicle 600 is to perform the action, among other possibilities. The derived behavior plan for vehicle 600 may define other planned aspects of the vehicle's behavior as well.

Further, in practice, planning subsystem 602c may derive the behavior plan for vehicle 600 in various manners. For instance, as one possibility, planning subsystem 602c may be configured to derive the behavior plan for vehicle 600 by (i) deriving a plurality of different "candidate" behavior plans for vehicle 600 based on the one or more derived representations of the vehicle's surrounding environment (and perhaps other data), (ii) evaluating the candidate behavior plans relative to one another (e.g., by scoring the candidate behavior plans using one or more cost functions) in order to identify which candidate behavior plan is most desirable when considering factors such as proximity to other objects, velocity, acceleration, time and/or distance to destination, road conditions, weather conditions, traffic conditions, and/or traffic laws, among other possibilities, and then (iii) selecting the candidate behavior plan identified as being most desirable as the behavior plan to use for vehicle 600. Planning subsystem 602c may derive the behavior plan for vehicle 600 in various other manners as well.

After deriving the behavior plan for vehicle 600, planning subsystem 602c may pass data indicating the derived behavior plan to control subsystem 602d. In turn, control subsystem 602d may be configured to transform the behavior plan for vehicle 600 into one or more control signals (e.g., a set of one or more command messages) for causing vehicle 600 to execute the behavior plan. For instance, based on the behavior plan for vehicle 600, control subsystem 602d may be configured to generate control signals for causing vehicle 600 to adjust its steering in a specified manner, accelerate in a specified manner, and/or brake in a specified manner, among other possibilities.

As shown, control subsystem 602d may then pass the one or more control signals for causing vehicle 600 to execute the behavior plan to vehicle-interface subsystem 602e. In turn, vehicle-interface subsystem 602e may be configured to translate the one or more control signals into a format that can be interpreted and executed by components of vehicle-control system 603. For example, vehicle-interface subsystem 602e may be configured to translate the one or more control signals into one or more control messages are defined according to a particular format or standard, such as a CAN bus standard and/or some other format or standard that is used by components of vehicle-control system 603.

In turn, vehicle-interface subsystem 602e may be configured to direct the one or more control signals to the appropriate control components of vehicle-control system 603. For instance, as shown, vehicle-control system 603 may include a plurality of actuators that are each configured to control a respective aspect of the vehicle's physical operation, such as a steering actuator 603a that is configured to control the vehicle components responsible for steering (not shown), an acceleration actuator 603b that is configured to control the vehicle components responsible for acceleration such as a throttle (not shown), and a braking actuator 603c that is configured to control the vehicle components responsible for braking (not shown), among other possibilities. In such an arrangement, vehicle-interface subsystem 602e of on-board computing system 602 may be configured to direct steering-related control signals to steering actuator 603a, acceleration-related control signals to acceleration actuator 603b, and braking-related control signals to braking actuator 603c. However, it should be understood that the control components of vehicle-control system 603 may take various other forms as well.

Notably, the subsystems of on-board computing system 602 may be configured to perform the above functions in a repeated manner, such as many times per second, which may enable vehicle 600 to continually update both its understanding of the surrounding environment and its planned behavior within that surrounding environment.

Although not specifically shown, it should be understood that vehicle 600 includes various other systems and components as well, including but not limited to a propulsion system that is responsible for creating the force that leads to the physical movement of vehicle 600.

Figure 7:
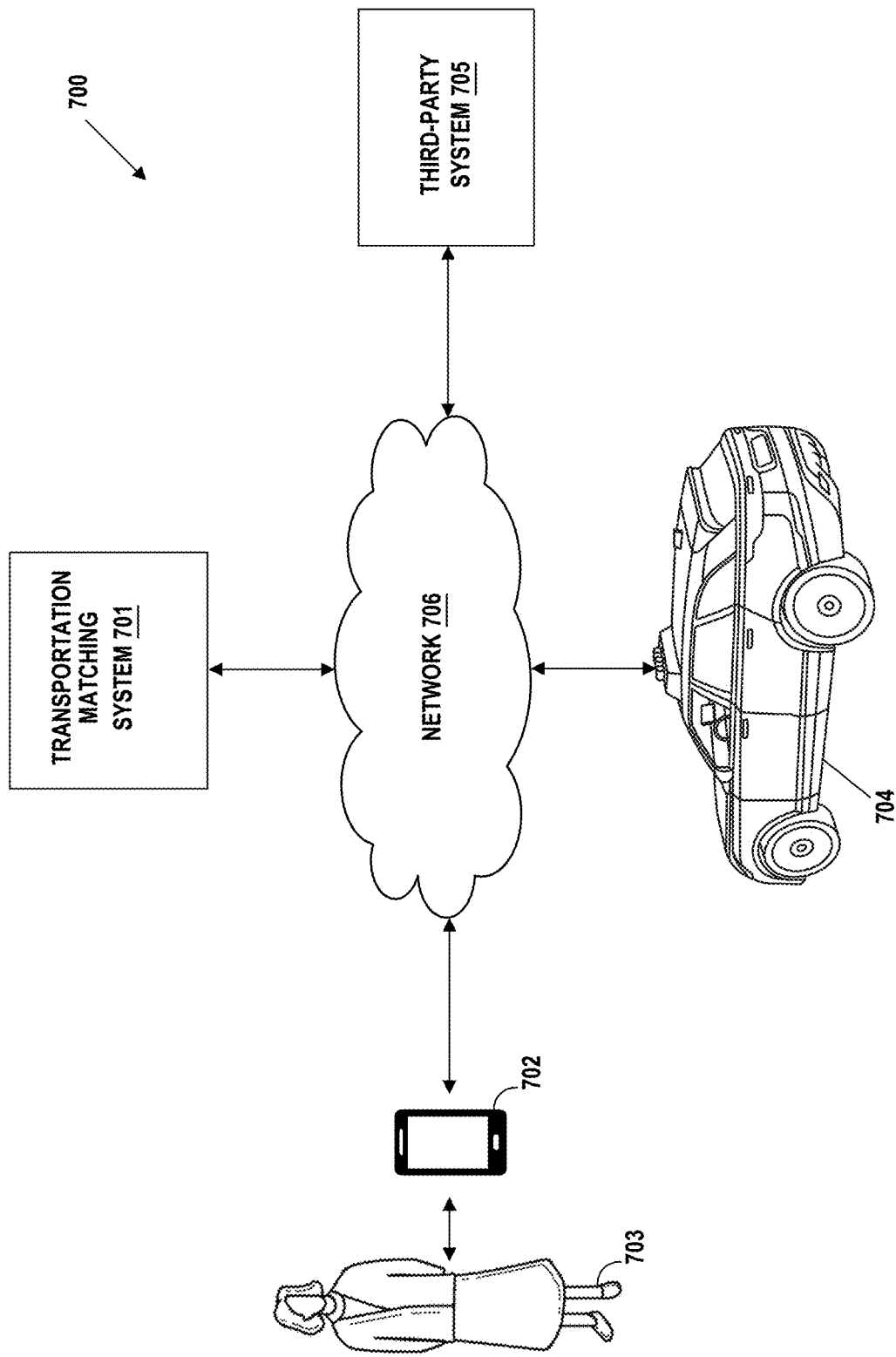
FIG. 7 is a simplified block diagram that illustrates one example of a transportation-matching platform.

Turning now to FIG. 7, a simplified block diagram is provided to illustrate one example of a transportation-matching platform 700 that functions to match individuals interested in obtaining transportation from one location to another with vehicles that can provide such transportation. As shown, transportation-matching platform 700 may include at its core a transportation-matching system 701, which may be communicatively coupled via a communication network 706 to (i) a plurality of client stations of individuals interested in transportation (i.e., "transportation requestors"), of which client station 702 of transportation requestor 703 is shown as one representative example, (ii) a plurality of vehicles that are capable of providing the requested transportation, of which vehicle 704 is shown as one representative example, and (iii) a plurality of third-party systems that are capable of providing respective sub-services that facilitate the platform's transportation matching, of which third-party system 705 is shown as one representative example.

Broadly speaking, transportation-matching system 701 may include one or more computing systems that collectively comprise a communication interface, at least one processor, data storage, and executable program instructions for carrying out functions related to managing and facilitating transportation matching. These one or more computing systems may take various forms and be arranged in various manners. For instance, as one possibility, transportation-matching system 701 may comprise computing infrastructure of a public, private, and/or hybrid cloud (e.g., computing and/or storage clusters). In this respect, the entity that owns and operates transportation-matching system 701 may either supply its own cloud infrastructure or may obtain the cloud infrastructure from a third-party provider of "on demand" computing resources, such as Amazon Web Services (AWS), Microsoft Azure, Google Cloud, Alibaba Cloud, or the like. As another possibility, transportation-matching system 701 may comprise one or more dedicated servers. Other implementations of transportation-matching system 701 are possible as well.

As noted, transportation-matching system 701 may be configured to perform functions related to managing and facilitating transportation matching, which may take various forms. For instance, as one possibility, transportation-matching system 701 may be configured to receive transportation requests from client stations of transportation requestors (e.g., client station 702 of transportation requestor 703) and then fulfill such transportation requests by dispatching suitable vehicles, which may include vehicle 704. In this respect, a transportation request from client station 702 of transportation requestor 703 may include various types of information.

For example, a transportation request from client station 702 of transportation requestor 703 may include specified pick-up and drop-off locations for the transportation. As another example, a transportation request from client station 702 of transportation requestor 703 may include an identifier that identifies transportation requestor 703 in transportation-matching system 701, which may be used by transportation-matching system 701 to access information about transportation requestor 703 (e.g., profile information) that is stored in one or more data stores of transportation-matching system 701 (e.g., a relational database system), in accordance with the transportation requestor's privacy settings. This transportation requestor information may take various forms, examples of which include profile information about transportation requestor 703. As yet another example, a transportation request from client station 702 of transportation requestor 703 may include preferences information for transportation requestor 703, examples of which may include vehicle-operation preferences (e.g., safety comfort level, preferred speed, rates of acceleration or deceleration, safety distance from other vehicles when traveling at various speeds, route, etc.), entertainment preferences (e.g., preferred music genre or playlist, audio volume, display brightness, etc.), temperature preferences, and/or any other suitable information.

As another possibility, transportation-matching system 701 may be configured to access information related to a requested transportation, examples of which may include information about locations related to the transportation, traffic data, route options, optimal pick-up or drop-off locations for the transportation, and/or any other suitable information associated with requested transportation. As an example and not by way of limitation, when transportation-matching system 701 receives a request for transportation from San Francisco International Airport (SFO) to Palo Alto, California, system 701 may access or generate any relevant information for this particular transportation request, which may include preferred pick-up locations at SFO, alternate pick-up locations in the event that a pick-up location is incompatible with the transportation requestor (e.g., the transportation requestor may be disabled and cannot access the pick-up location) or the pick-up location is otherwise unavailable due to construction, traffic congestion, changes in pick-up/drop-off rules, or any other reason, one or more routes to travel from SFO to Palo Alto, preferred off-ramps for a type of transportation requestor, and/or any other suitable information associated with the transportation.

In some embodiments, portions of the accessed information could also be based on historical data associated with historical transportation facilitated by transportation-matching system 701. For example, historical data may include aggregate information generated based on past transportation information, which may include any information described herein and/or other data collected by sensors affixed to or otherwise located within vehicles (including sensors of other computing devices that are located in the vehicles such as client stations). Such historical data may be associated with a particular transportation requestor (e.g., the particular transportation requestor's preferences, common routes, etc.), a category/class of transportation requestors (e.g., based on demographics), and/or all transportation requestors of transportation-matching system 701.

For example, historical data specific to a single transportation requestor may include information about past rides that a particular transportation requestor has taken, including the locations at which the transportation requestor is picked up and dropped off, music the transportation requestor likes to listen to, traffic information associated with the rides, time of day the transportation requestor most often rides, and any other suitable information specific to the transportation requestor. As another example, historical data associated with a category/class of transportation requestors may include common or popular ride preferences of transportation requestors in that category/class, such as teenagers preferring pop music, transportation requestors who frequently commute to the financial district may prefer to listen to the news, etc. As yet another example, historical data associated with all transportation requestors may include general usage trends, such as traffic and ride patterns.

Using such historical data, transportation-matching system 701 could be configured to predict and provide ride suggestions in response to a transportation request. For instance, transportation-matching system 701 may be configured to apply one or more machine-learning techniques to such historical data in order to "train" a machine-learning model to predict ride suggestions for a transportation request. In this respect, the one or more machine-learning techniques used to train such a machine-learning model may take any of various forms, examples of which may include a regression technique, a neural-network technique, a k-Nearest Neighbor (kNN) technique, a decision-tree technique, a support-vector-machines (SVM) technique, a Bayesian technique, an ensemble technique, a clustering technique, an association-rule-learning technique, and/or a dimensionality-reduction technique, among other possibilities.

In operation, transportation-matching system 701 may only be capable of storing and later accessing historical data for a given transportation requestor if the given transportation requestor previously decided to "opt-in" to having such information stored. In this respect, transportation-matching system 701 may maintain respective privacy settings for each transportation requestor that uses transportation-matching platform 700 and operate in accordance with these settings. For instance, if a given transportation requestor did not opt-in to having his or her information stored, then transportation-matching system 701 may forgo performing any of the above-mentioned functions based on historical data. Other possibilities also exist.

Transportation-matching system 701 may be configured to perform various other functions related to managing and facilitating transportation matching as well.

Referring again to FIG. 7, client station 702 of transportation requestor 703 may generally comprise any computing device that is configured to facilitate interaction between transportation requestor 703 and transportation-matching system 701. For instance, client station 702 may take the form of a smartphone, a tablet, a desktop computer, a laptop, a netbook, and/or a PDA, among other possibilities. Each such device may comprise an I/O interface, a communication interface, a GNSS unit such as a GPS unit, at least one processor, data storage, and executable program instructions for facilitating interaction between transportation requestor 703 and transportation-matching system 701 (which may be embodied in the form of a software application, such as a mobile application, web application, or the like). In this respect, the interaction that may take place between transportation requestor 703 and transportation-matching system 701 may take various forms, representative examples of which may include requests by transportation requestor 703 for new transportation events, confirmations by transportation-matching system 701 that transportation requestor 703 has been matched with a vehicle (e.g., vehicle 704), and updates by transportation-matching system 701 regarding the progress of the transportation event, among other possibilities.

In turn, vehicle 704 may generally comprise any kind of vehicle that can provide transportation, and in one example, may take the form of vehicle 600 described above. Further, the functionality carried out by vehicle 704 as part of transportation-matching platform 700 may take various forms, representative examples of which may include receiving a request from transportation-matching system 701 to handle a new transportation event, driving to a specified pickup location for a transportation event, driving from a specified pickup location to a specified drop-off location for a transportation event, and providing updates regarding the progress of a transportation event to transportation-matching system 701, among other possibilities.

Generally speaking, third-party system 705 may include one or more computing systems that collectively comprise a communication interface, at least one processor, data storage, and executable program instructions for carrying out functions related to a third-party subservice that facilitates the platform's transportation matching. These one or more computing systems may take various forms and may be arranged in various manners, such as any one of the forms and/or arrangements discussed above with reference to transportation-matching system 701.

Moreover, third-party system 705 may be configured to perform functions related to various subservices. For instance, as one possibility, third-party system 705 may be configured to monitor traffic conditions and provide traffic data to transportation-matching system 701 and/or vehicle 704, which may be used for a variety of purposes. For example, transportation-matching system 701 may use such data to facilitate fulfilling transportation requests in the first instance and/or updating the progress of initiated transportation events, and vehicle 704 may use such data to facilitate updating certain predictions regarding perceived agents and/or the vehicle's behavior plan, among other possibilities.

As another possibility, third-party system 705 may be configured to monitor weather conditions and provide weather data to transportation-matching system 701 and/or vehicle 704, which may be used for a variety of purposes. For example, transportation-matching system 701 may use such data to facilitate fulfilling transportation requests in the first instance and/or updating the progress of initiated transportation events, and vehicle 704 may use such data to facilitate updating certain predictions regarding perceived agents and/or the vehicle's behavior plan, among other possibilities.

As yet another possibility, third-party system 705 may be configured to authorize and process electronic payments for transportation requests. For example, after transportation requestor 703 submits a request for a new transportation event via client station 702, third-party system 705 may be configured to confirm that an electronic payment method for transportation requestor 703 is valid and authorized and then inform transportation-matching system 701 of this confirmation, which may cause transportation-matching system 701 to dispatch vehicle 704 to pick up transportation requestor 703. After receiving a notification that the transportation event is complete, third-party system 705 may then charge the authorized electronic payment method for transportation requestor 703 according to the fare for the transportation event. Other possibilities also exist.

Third-party system 705 may be configured to perform various other functions related to subservices that facilitate the platform's transportation matching as well. It should be understood that, although certain functions were discussed as being performed by third-party system 705, some or all of these functions may instead be performed by transportation-matching system 701.

As discussed above, transportation-matching system 701 may be communicatively coupled to client station 702, vehicle 704, and third-party system 705 via communication network 706, which may take various forms. For instance, at a high level, communication network 706 may include one or more Wide-Area Networks (WANs) (e.g., the Internet or a cellular network), Local-Area Networks (LANs), and/or Personal Area Networks (PANs), among other possibilities, where each such network may be wired and/or wireless and may carry data according to any of various different communication protocols. Further, it should be understood that the respective communication paths between the various entities of FIG. 7 may take other forms as well, including the possibility that such communication paths include communication links and/or intermediate devices that are not shown.

In the foregoing arrangement, client station 702, vehicle 704, and/or third-party system 705 may also be capable of indirectly communicating with one another via transportation-matching system 701. Additionally, although not shown, it is possible that client station 702, vehicle 704, and/or third-party system 705 may be configured to communicate directly with one another as well (e.g., via a short-range wireless communication path or the like). Further, vehicle 704 may also include a user-interface system that may facilitate direct interaction between transportation requestor 703 and vehicle 704 once transportation requestor 703 enters vehicle 704 and the transportation event begins.

It should be understood that transportation-matching platform 700 may include various other entities and take various other forms as well.

Figure 8:
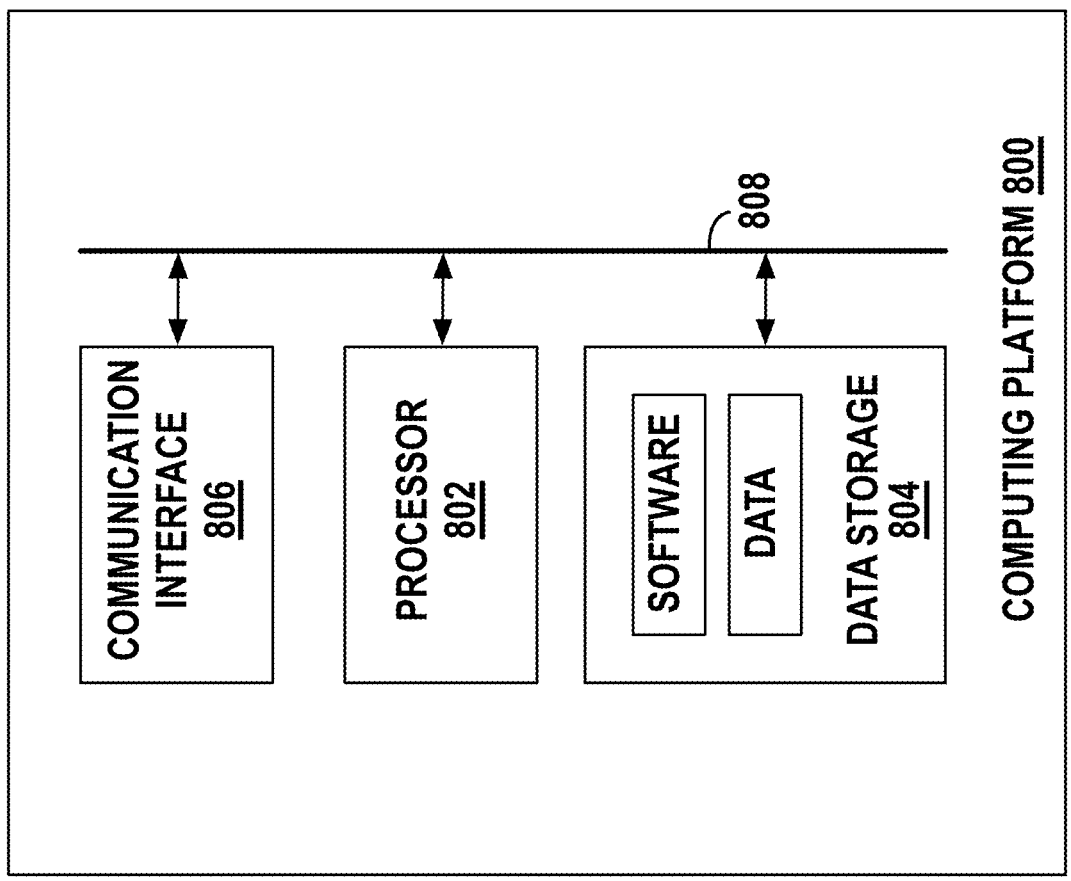
FIG. 8 is a simplified block diagram that illustrates some structural components that may be included in an example computing platform.

Turning now to FIG. 8, a simplified block diagram is provided to illustrate some structural components that may be included in an example computing platform 800, which may be configured to carry out the any of various functions disclosed herein. At a high level, computing platform 800 may generally comprise any one or more computer systems (e.g., one or more servers) that collectively include at least a processor 802, data storage 804, and a communication interface 806, all of which may be communicatively linked by a communication link 808 that may take the form of a system bus, a communication network such as a public, private, or hybrid cloud, or some other connection mechanism. Each of these components may take various forms.

For instance, processor 802 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 802 could comprise processing components that are distributed across a plurality of physical computing devices connected via a network, such as a computing cluster of a public, private, or hybrid cloud.

In turn, data storage 804 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 804 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 8, data storage 804 may be capable of storing both (i) program instructions that are executable by processor 802 such that on-board computing system 402b is configured to perform any of the various functions disclosed herein (including but not limited to any the functions described with reference to FIGS. 2, 3A-3I, 4A-4D, and 5A-C), and (ii) data that may be received, derived, or otherwise stored by computing platform 800.

Communication interface 806 may take the form of any one or more interfaces that facilitate communication between computing platform 800 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

Although not shown, computing platform 800 may additionally include one or more input/output (I/O) interfaces that are configured to either (i) receive and/or capture information at computing platform 800 and (ii) output information from computing platform 800 (e.g., for presentation to a user). In this respect, the one or more I/O interfaces may include or provide connectivity to input components such as a microphone, a camera, a keyboard, a mouse, a trackpad, a touchscreen, and/or a stylus, among other possibilities, as well as output components such as a display screen and/or an audio speaker, among other possibilities.

It should be understood that computing platform 800 is one example of a computing platform that may be used with the embodiments described herein. Numerous other arrangements are possible and contemplated herein. For instance, other computing platforms may include additional components not pictured and/or more or less of the pictured components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and sprit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A computer-implemented method comprising:
   using a first approach to produce a first representation of an agent's trajectory from a first set of sensor data;
   using a second approach to produce a second representation of the agent's trajectory from a second set of sensor data, wherein the first and second representations of the agent's trajectory are based on different spatial reference frames and different temporal reference frames;
   aligning the spatial reference frames of the first and second representations by applying a spatial transformation to one of the first or second representations;
   aligning the temporal reference frames of the first and second representations by applying an origin-time offset to one of the first or second representations;
   performing a comparison between the aligned first and second representations of the agent's trajectory; and
   using the comparison to evaluate an accuracy of the first approach for producing trajectories relative to the second approach for producing trajectories.

2. The computer-implemented method of claim 1, wherein:
   using the first approach to produce the first representation of the agent's trajectory from the first set of sensor data comprises using a first processing technique to derive the first representation of the agent's trajectory from the first set of sensor data; and
   using the second approach to produce the second representation of the agent's trajectory from the second set of sensor data comprises using a second processing technique to derive the second representation of the agent's trajectory from the second set of sensor data, wherein the first processing technique differs from the second processing technique.

3. The computer-implemented method of claim 1, wherein aligning the spatial reference frames of the first and second representations by applying the spatial transformation to one of the first or second representations comprises:
   identifying a spatial transformation for a given one of the first or second representations that achieves a best geometric match between the first representation and the second representation; and
   applying the identified spatial transformation to the given one of the first or second representations.

4. The computer-implemented method of claim 1, wherein aligning the temporal reference frames of the first and second representations further comprises, before applying the origin-time offset to one of the first or second representations:
   determining, as the origin-time offset, an offset value that minimizes a positional error between a set of position and orientation ("pose") values included in the first representation and a counterpart set of pose values included in the second representation.

5. The computer-implemented method of claim 1, wherein aligning the temporal reference frames of the first and second representations further comprises:
   aligning a first time-interval scale of the first representation with a second time-interval scale of the second representation.

6. The computer-implemented method of claim 1, wherein aligning the spatial reference frames of the first and second representations further comprises:
   identifying a rotation amount that minimizes an orientational error between a set of position and orientation ("pose") values included in the first representation and a counterpart set of pose values included in the second representation; and
   applying the identified rotation amount to each pose value of the set of pose values included in a given one of the first or second representations.

7. The computer-implemented method of claim 1, wherein using the comparison to evaluate the accuracy of the first approach for producing trajectories relative to the second approach for producing trajectories comprises:
   determining an error metric that indicates an extent to which the first representation of the agent's trajectory differs from the second representation of the agent's trajectory; and
   using the determined error metric as a basis for evaluating the accuracy of the first approach for producing trajectories relative to the second approach for producing trajectories.

8. The computer-implemented method of claim 1, wherein using the comparison to evaluate the accuracy of the first approach for producing trajectories relative to the second approach for producing trajectories comprises:
   using the first representation of the agent's trajectory to derive a first characterization of a given instance of a scenario type;
   using the second representation of the agent's trajectory to derive a second characterization of the given instance of the scenario type; and
   using the first and second characterizations of the given instance of the scenario type as a basis for evaluating the accuracy of the first approach for producing trajectories relative to the second approach for producing trajectories.

9. The computer-implemented method of claim 8, wherein using the first and second characterizations of the given instance of the scenario type as a basis for evaluating the accuracy of the first approach for producing trajectories relative to the second approach for producing trajectories comprises:

including the first characterization as part of a first dataset characterizing instances of the scenario type, wherein the first dataset is derived based on trajectories produced using the first approach;

including the second characterization as part of a second dataset characterizing instances of the scenario type, wherein the second dataset is derived based on trajectories produced using the second approach;

performing a comparison between the first dataset and the second dataset; and using the comparison between the first dataset and the second dataset as a basis for evaluating the accuracy of the first approach for producing trajectories relative to the second approach for producing trajectories.

10. The computer-implemented method of claim 1, wherein the first set of sensor data differs from the second set of sensor data.

11. A non-transitory computer-readable medium comprising program instructions stored thereon that, when executed by at least one processor of a computing system, cause the computing system to perform functions comprising:

using a first approach to produce a first representation of an agent's trajectory from a first set of sensor data;

using a second approach to produce a second representation of the agent's trajectory from a second set of sensor data, wherein the first and second representations of the agent's trajectory are based on different spatial reference frames and different temporal reference frames;

aligning the spatial reference frames of the first and second representations by applying a spatial transformation to one of the first or second representations;

aligning the temporal reference frames of the first and second representations by applying an origin-time offset to one of the first or second representations;

performing a comparison between the aligned first and second representations of the agent's trajectory; and using the comparison to evaluate an accuracy of the first approach for producing trajectories relative to the second approach for producing trajectories.

12. The non-transitory computer-readable medium of claim 11, wherein:

using the first approach to produce the first representation of the agent's trajectory from the first set of sensor data comprises using a first processing technique to derive the first representation of the agent's trajectory from the first set of sensor data; and using the second approach to produce the second representation of the agent's trajectory from the second set of sensor data comprises using a second processing technique to derive the second representation of the agent's trajectory from the second set of sensor data, wherein the first processing technique differs from the second processing technique.

13. A computing system comprising:

at least one processor;

at least one non-transitory computer-readable medium; and program instructions stored on the at least one non-transitory computer-readable medium that, when executed by the at least one processor, cause the computing system to perform functions comprising:

using a first approach to produce a first representation of an agent's trajectory from a first set of sensor data;

using a second approach to produce a second representation of the agent's trajectory from a second set of sensor data, wherein the first and second representations of the agent's trajectory are based on different spatial reference frames and different temporal reference frames;

aligning the spatial reference frames of the first and second representations by applying a spatial transformation to one of the first or second representations;

aligning the temporal reference frames of the first and second representations by applying an origin-time offset to one of the first or second representations;

performing a comparison between the aligned first and second representations of the agent's trajectory; and using the comparison to evaluate an accuracy of the first approach for producing trajectories relative to the second approach for producing trajectories.

14. The computing system of claim 13, wherein:

using the first approach to produce the first representation of the agent's trajectory from the first set of sensor data comprises using a first processing technique to derive the first representation of the agent's trajectory from the first set of sensor data; and using the second approach to produce the second representation of the agent's trajectory from the second set of sensor data comprises using a second processing technique to derive the second representation of the agent's trajectory from the second set of sensor data, wherein the first processing technique differs from the second processing technique.

15. The computing system of claim 13, wherein aligning the temporal reference frames of the first and second representations further comprises, before applying the origin-time offset to one of the first or second representations:

determining, as the origin-time offset, an offset value that minimizes a positional error between a set of position and orientation ("pose") values included in the first representation and a counterpart set of pose values included in the second representation.

16. The computing system of claim 13, wherein aligning the temporal reference frames of the first and second representations further comprises:

aligning a first time-interval scale of the first representation with a second time-interval scale of the second representation.

17. The computing system of claim 13, wherein aligning the spatial reference frames of the first and second representations further comprises:

identifying a rotation amount that minimizes an orientational error between a set of position and orientation ("pose") values included in the first representation and a counterpart set of pose values included in the second representation; and applying the identified rotation amount to each pose value of the set of pose values included in a given one of the first or second representations.

18. The computing system of claim 13, wherein using the comparison to evaluate the accuracy of the first approach for producing trajectories relative to the second approach for producing trajectories comprises:

determining an error metric that indicates an extent to which the first representation differs from the second representation; and using the determined error metric as a basis for evaluating the accuracy of the first approach for producing trajectories relative to the second approach for producing trajectories.

19. The computing system of claim 13, wherein using the comparison to evaluate the accuracy of the first approach for producing trajectories relative to the second approach for producing trajectories comprises:
- using the first representation of the agent's trajectory to derive a first characterization of a given instance of a scenario type;
- using the second representation of the agent's trajectory to derive a second characterization of the given instance of the scenario type; and
- using the first and second characterizations of the given instance of the scenario type as a basis for evaluating the accuracy of the first approach for producing trajectories relative to the second approach for producing trajectories.

20. The computing system of claim 19, wherein using the first and second characterizations of the given instance of the scenario type as a basis for evaluating the accuracy of the first approach for producing trajectories relative to the second approach for producing trajectories comprises:
- including the first characterization as part of a first dataset characterizing instances of the scenario type, wherein the first dataset is derived based on trajectories produced using the first approach;
- including the second characterization as part of a second dataset characterizing instances of the scenario type, wherein the second dataset is derived based on trajectories produced using the second approach;
- performing a comparison between the first dataset and the second dataset; and using the comparison between the first dataset and the second dataset as a basis for evaluating the accuracy of the first approach for producing trajectories relative to the second approach for producing trajectories.

* * * * *